US011468325B2

(12) United States Patent
Kaplan et al.

(10) Patent No.: US 11,468,325 B2
(45) Date of Patent: Oct. 11, 2022

(54) MULTI-MODEL TRAINING PIPELINE IN DISTRIBUTED SYSTEMS

(71) Applicant: Amazon Technologies, Inc., Seattle, WA (US)

(72) Inventors: Patricio Kaplan, Palo Alto, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 16/835,161

(22) Filed: Mar. 30, 2020

(65) Prior Publication Data

US 2021/0303988 A1 Sep. 30, 2021

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ................ G06N 3/08–088; G06N 3/0454
See application file for complete search history.

(56) References Cited

U.S. PATENT DOCUMENTS

| | | | |
|---|---|---|---|
| 2019/0042934 A1* | 2/2019 | Arunachalam | G06F 1/324 |
| 2020/0104706 A1* | 4/2020 | Sandler | G06N 3/082 |
| 2021/0142152 A1* | 5/2021 | Burkhart | G06N 3/08 |
| 2021/0295168 A1* | 9/2021 | Xu | G06N 5/046 |
| 2021/0303988 A1* | 9/2021 | Kaplan | G06N 3/0454 |
| 2021/0304008 A1* | 9/2021 | Kaplan | G06N 5/046 |
| 2021/0350211 A1* | 11/2021 | Dalli | G06N 3/0454 |
| 2021/0374544 A1* | 12/2021 | Zang | G06N 3/063 |
| 2022/0027738 A1* | 1/2022 | Zang | G06N 3/063 |
| 2022/0129408 A1* | 4/2022 | Yuan | G06F 15/17306 |

* cited by examiner

*Primary Examiner* — Sean T Motsinger
(74) *Attorney, Agent, or Firm* — Kilpatrick Townsend & Stockton LLP

(57) ABSTRACT

A first worker node of a distributed system computes a first set of gradients using a first neural network model and a first set of weights associated with the first neural network model. The first set of gradients are transmitted from the first worker node to a second worker node of the distributed system. The second worker node computes a first set of synchronized gradients based on the first set of gradients. While the first set of synchronized gradients are being computed, the first worker node computes a second set of gradients using a second neural network model and a second set of weights associated with the second neural network model. The second set of gradients are transmitted from the first worker node to the second worker node. The second worker node computes a second set of synchronized gradients based on the second set of gradients.

20 Claims, 14 Drawing Sheets

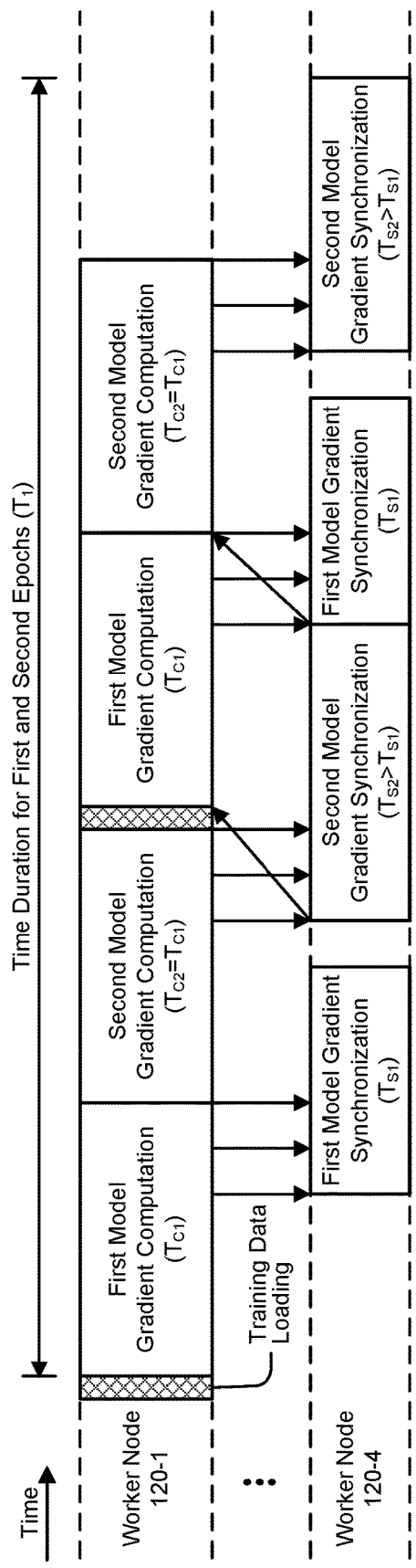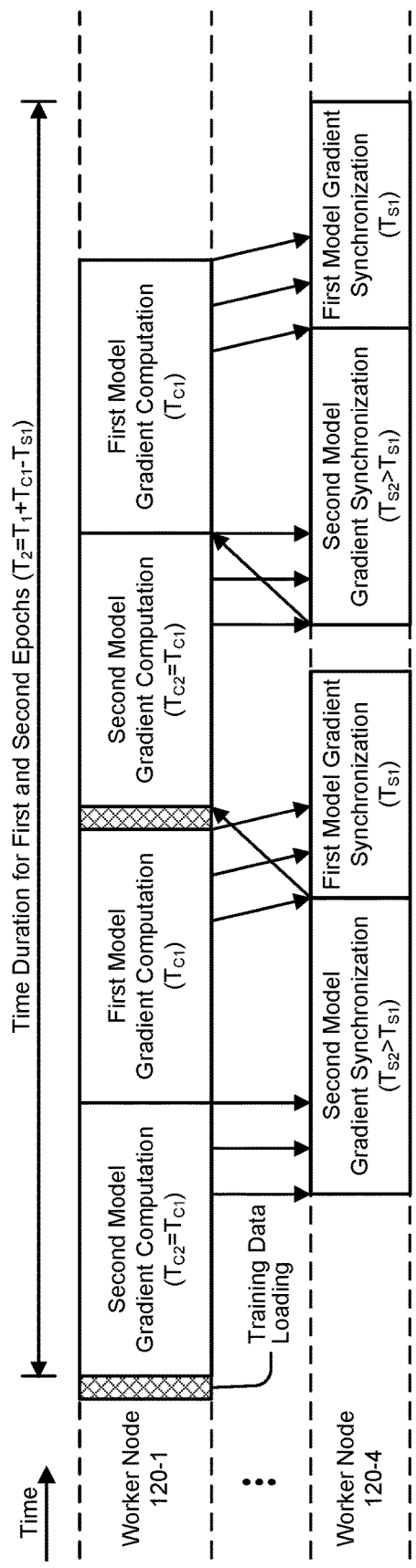

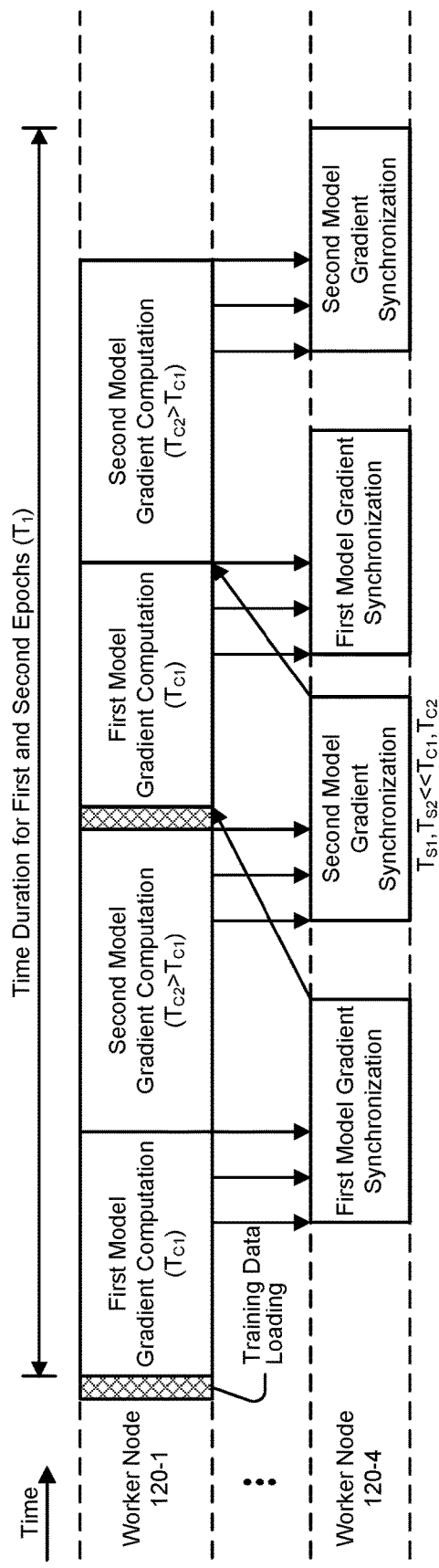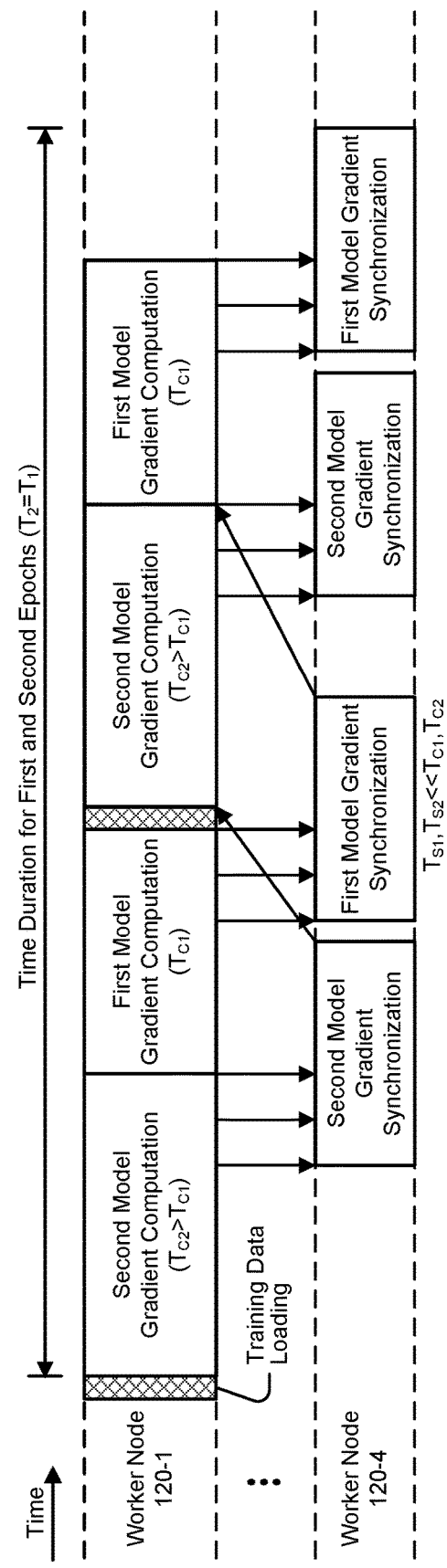

MULTI-MODEL TRAINING PIPELINE IN DISTRIBUTED SYSTEMS

BACKGROUND

Artificial neural networks, which are often simply referred to as neural networks, are computing systems with architectures based on biological neural networks. Neural networks can be trained using training data to learn how to perform certain tasks, such as identifying or classifying physical objects, activities, characters, etc., from images or videos. A neural network may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. A neural network may include thousands or more of processing nodes and millions or more of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network. Recently, special-purpose integrated circuit devices, such as neural network processors or accelerators, have been developed to execute neural networks more efficiently than either CPUs or GPUs. These devices include spatial architectures in which arithmetic logic units (ALUs) can pass data from one to another directly, in contrast to the temporal architectures employed by CPUs and GPUs in which ALUs can only fetch data from the memory hierarchy but cannot communicate directly with each other.

When a neural network is trained to perform a particular function, the parameters of the neural network (e.g., its weights, which represent the strength of connections between different processing nodes) are adjusted over multiple iterations. The training process involves supplying the neural network with training data, which can include training input data and corresponding reference output data which can support a particular decision (e.g., a detection or a non-detection of an object in an image). The neural network can perform computations to combine the weights with the training input data to generate training output data, and the training output data can be compared against the reference output data to generate error data (representing the differences between the two). During the training, different training input data can be provided to the neural network to generate different training output data. The weights of the neural network can be adjusted based on an objective such as, for example, minimizing the differences between the training output data and the reference output data. To improve the likelihood of the neural network generating a correct decision, typically a large volume of training input data covering a large number of operation scenarios is used to train a neural network. As a result, a training operation typically requires significant time and computation resources.

BRIEF DESCRIPTION OF THE DRAWINGS

Various embodiments in accordance with the present disclosure will be described with reference to the drawings, in which:

FIGS. 9A and 9B illustrate additional example timing diagrams for multiple-model neural network training;

FIGS. 10A and 10B illustrate additional example timing diagrams for multiple-model neural network training;

DETAILED DESCRIPTION

Figure 1:
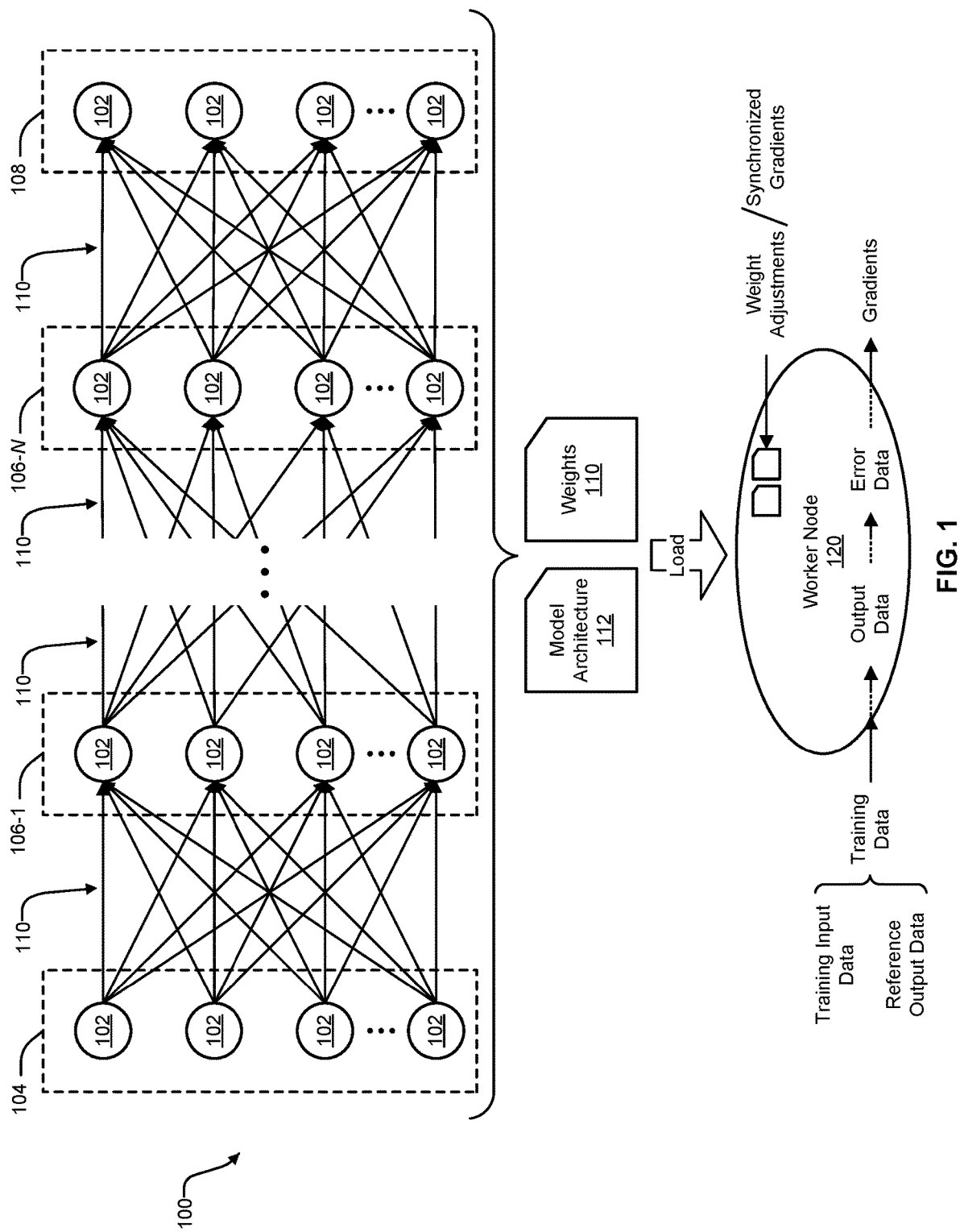
FIG. 1 illustrates an example of a computational flow model for a neural network.

During training of a neural network, a first neural network layer can receive training input data, combine the training input data with the weights (e.g., by multiplying the training input data with the weights and then summing the products) to generate first output data for the neural network layer, and propagate the output data to a second neural network layer, in a forward propagation operation. The second neural network layer performs another forward propagation operation on the first output data from the first neural network layer to generate second output data, and propagates the second output data to higher neural network layers. The forward propagation operations can start at the first neural network layer and end at the highest neural network layer. The forward propagation operation at each neural network layer can represent different stages of extraction and processing of information from the training input data. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by the training process to improve the likelihood of the neural network generating a correct decision. An example training process can use a gradient descent scheme. Specifically, as part of the training process, forward propagation operations can be performed on training input data, using the set of weights at each neural network layer, to generate training output data at the highest level neural network layer. The training output data can be compared with reference output data that supports a particular decision. A set of gradients can be generated based on, for example, differences between the training output data and the reference output data.

As part of the training process, each neural network layer can then perform a backward propagation process to adjust the set of weights at each neural network layer. Specifically, the highest neural network layer can receive the set of gradients and compute, in a backward propagation operation, a set of first data gradients and a set of first weight gradients based on applying the set of weights to the input data gradients in similar mathematical operations as the forward propagation operation. The highest neural network layer can adjust the set of weights of the layer based on the set of first weight gradients, whereas the set of first data gradients can be propagated to the second highest neural network layer to influence the adjustment of the set of weights of the previous neural network layer. The backward propagation operations can start from the highest neural network layer and end at the first neural network layer. The set of weights at each neural network layer can be adjusted, to complete one iteration of the training process. The training process can be repeated for the same training data for a number of iterations until a loss objective (e.g., a threshold input data gradient) is achieved.

A training process is typically very time-consuming due to the sequential nature and data dependency among the operations involved in the training process. Specifically, in a training process, a forward propagation operation is first performed at each neural network layer to compute output data, then input data gradients are computed based on the output data (and reference output data), then a backward propagation operation is performed at each neural network layer to compute the weight gradients, which is then followed by the updating of the weights at each neural network layer. As the backward propagation operations depend on the forward propagation operations, the two sets of operations may not be performed in parallel. Moreover, due to data dependency among the neural network layers, the forward propagation operations and the backward propagation operations also need to be performed sequentially for each neural network layer. The lack of parallelism can drastically increase the training time, which is further increased when multiple iterations of the training process on the same training input data are performed to achieve the loss objective. Moreover, the training process typically involves supplying the neural network with multiple sets of training data to cover different operation conditions, such that the neural network can be trained to provide a correct decision under those different operation conditions. The computing system that implements the neural network may need to perform additional training processes to process the additional training input data, which will further increase the training time. Coupled with the fact that the training process typically requires a higher precision than the inference operation, a slow training process can put a lot of stress on the computation resources.

A distributed system can accelerate a training process by distributing the training process across multiple computing systems, which can be referred to as worker nodes. Training data can be split into multiple portions, with each portion to be processed by a worker node. Each worker node can perform the forward and backward propagation operations independently, and in parallel with each other, based on a portion of the training input data, to generate a set of weight gradients for each neural network layer. Each worker node can exchange its set of weight gradients with other worker nodes, and average its set of weight gradients and the sets of weight gradients received from other worker nodes. Each computing node can have the same set of averaged weight gradients, and can then update a set of weights for each neural network layer based on the averaged weight gradients.

Distributing the training process across multiple worker nodes can reduce the amount of training input data to be processed at each worker node, which can reduce the execution time of the forward and backward propagation operations at each neural network layer and accelerate the training process. However, as distributed learning is typically implemented over a relatively low speed network, the exchange of weight gradients among the worker nodes can introduce a substantial bottleneck. For example, in a case where the distributed system is in a cloud infrastructure and worker nodes exchange weight gradients with each other by sending network packets, the network latency can be substantial relative to the execution times of the forward/backward propagation operations. The network latency can diminish the reduction in the training time brought about by the distributed system, or even increase the training time. The problem is exacerbated when training is being performed not just for a single neural network model but for multiple neural network models. Accordingly, techniques for reducing the training time in distributed training implementations are needed.

Embodiments described herein relate to systems, methods, and other techniques for reducing the training time for training multiple neural network models using a distributed system. Typically, training is performed sequentially for multiple neural network models, with training of a second neural network model beginning only once the training of a first neural network model has completed. During the training for each of the models, worker nodes compute weight gradients (or simply "gradients") for a set of training data, transmit the computed gradients to a separate worker node that synchronizes the gradients, and then sit idle until the synchronized gradients and/or updated weights are received so that adjusted weights may be used during the next training cycle.

In accordance with the described embodiments, instead of a worker node sitting idle waiting for the refreshed weights to start a new cycle, the worker node can switch contexts to a new set of weights from a different neural network model and compute gradients for that model. For example, a first worker node can compute gradients for a first neural network model using a first set of weights, transmit the gradients to a second worker node, and prior to receiving the synchronized gradients, the first worker node may load a second neural network model and an associated second set of weights and compute gradients for the second model.

The second worker node may begin to compute synchronized gradients as the gradients for different layers are received. For example, the second worker node may receive gradients from the first worker node one layer at a time. This allows the second worker node to begin synchronization earlier rather than having to wait for the full set of gradients for all layers of the neural network model. Once the second worker node has finished computing and transmitting the synchronized gradients back to the first worker node, it may begin to synchronize gradients for the second model instead of sitting idle waiting for the next cycle of gradients for the first model.

This technique increments the throughput of multiple model training on the same hardware by alternating between the gradient compute time of one model with the gradient compute time of another model, as well as causing the gradient compute time of one model on one worker node to overlap with the gradient synchronization time of another model on another worker node. The technique also allows the reuse of the same training input data for the different neural network models, which saves time as moving the training inputs into a worker node (e.g., an accelerator) over a relatively low bandwidth interconnect can consume a significant amount of time as well as pre-processing resources. The described embodiments further allow for various multi-tenancy schemes in which the same hardware can be used simultaneously by two different tenants to train their neural network models. This can be accomplished with minimal performance degradation observed by any of the tenants.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computational flow model for a neural network 100. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the neural network 100 includes an input layer 104, one or more middle layers that are often referred to as hidden layers 106, and an output layer 108. Each layer includes some number of nodes 102. In this example, each node 102 of the input layer 104 is connected to each node 102 of the hidden layer 106-1. The connections, which would be referred to as synapses in the brain model, are referred to as weights 110. Also in this example, each node 102 of the hidden layer 106-N has a connection or weight 110 with each node 102 of the output layer 108. The input layer 104 can receive inputs and can propagate the inputs to the hidden layer 106-1. Weighted sums computed by the hidden layer 106-1 are propagated to the remaining hidden layers 106 and subsequently to the output layer 108, which can present final outputs to a user. The outputs of the nodes 102 can be referred to as activations, in keeping with the brain model.

An example of a computation that can occur at each layer in the example neural network 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model of the neural network 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network 100 is taught to perform a task. In learning the task, values for the weights 110 (and possibly also the biases) are determined. The underlying model architecture 112 for the neural network (e.g., the organization of nodes into layers, the connections between the nodes of each layer, and the computation executed by each node) does not change during training. Once trained, the neural network 100 can perform the task by computing a result using the weights 110 values that were determined during training. Running the program for the neural network is referred to as inference.

As mentioned above, the training process of the neural network 100 can occur across multiple worker nodes of a distributed system, such as a worker node 120 illustrated in FIG. 1. In various implementations, the worker node 120 may be a neural network hardware accelerator, a general purpose hardware processor, or other suitable computing system that supports the arithmetic operations involved in neural network processing as described above. The worker node 120 may include a hardware interface to communicate with other worker nodes via a network. The worker node 120 may include computing resources to perform the operations of a training process, which can include forward propagation operations, loss gradient operations, and backward propagation operations. The worker node 120 may receive training data including training input data and reference output data. Based on the training input data, the worker node 120 may compute output data using the model architecture 112 and the weights 110. The worker node 120 may then compute error data by comparing the output data and the reference output data, which may be used to compute a set of gradients. The gradients may be distributed to other nodes in the distributed system for gradient synchronization. The worker node 120 may then receive synchronized gradients and/or weight adjustments that may be applied to the weights 110.

Because the worker node 120 is operating on different training data from other worker nodes in the distributed system (e.g., different portions of a training data set), the amount of error through an iteration of the training process can vary among the different worker nodes. To improve the accuracy of the neural network model across the different training data, the local gradients calculated by each worker node can be accumulated and then averaged to derive a set of averaged gradients. For example, if the neural network model utilizes twenty weight values, a first iteration of the training process at each worker node will produce twenty local gradients. The first local gradient from each worker node can be added together and be divided by the number of worker nodes to derive an averaged gradient for the first value. The calculation can be performed for each of the twenty gradients to derive a set of twenty averaged gradients.

Figure 2:
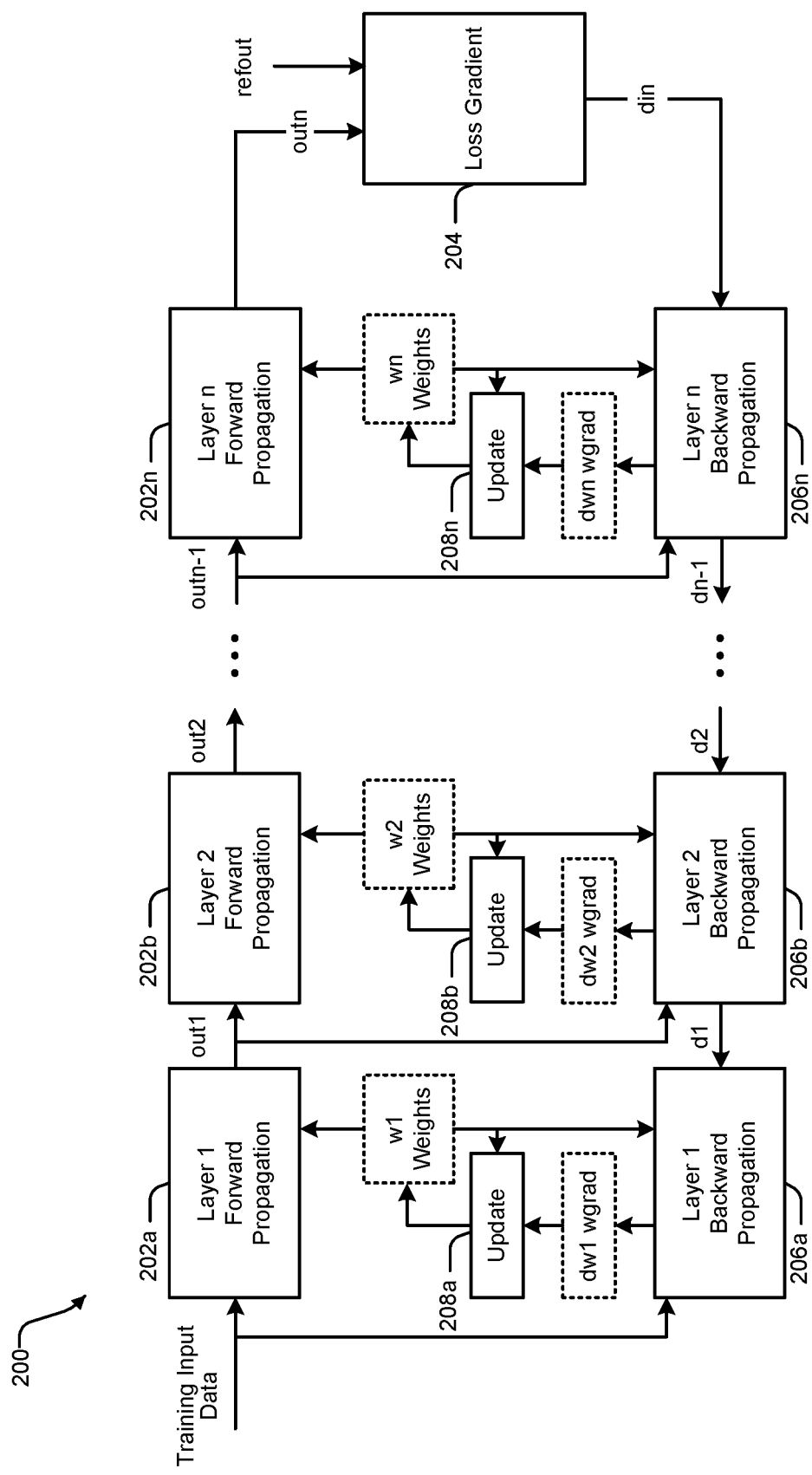
FIG. 2 illustrates an example of a training process to train a neural network.

FIG. 2 illustrates an example of a training process 200 to train a neural network, such as the neural network 100. As shown in FIG. 2, a forward propagation operation can be performed for each neural network layer, such as a forward propagation operation 202a for the lowest layer 1 (which can correspond to layer 104 of FIG. 1), a forward propagation operation 202a for layer 2 (which can correspond to layer 106-1 of FIG. 1), a forward propagation operation 202n for the highest layer n (which can correspond to layer 108 of FIG. 1), etc. A forward propagation operation at a neural network layer can include the multiplication and summation computations between input data and a set of weights for that layer, followed by activation function processing to generate output data. The output data can then propagate to the next neural network layer as input to the forward propagation operation at that layer. For example, as shown in FIG. 2, forward propagation operation 202a can combine training input data with w1 weights of layer 1 to generate output data out1, which propagate to layer 2 as input. Forward propagation operation 202b can combine data out1 with w2 weights of layer 2 to generate output data out2, which can then propagate to the next layer. At the highest layer n, forward propagation operation 202n receive data outn-1 from layer n-1 (not shown in FIG. 2), combine with wn weights of layer n, and generate output data outn.

A loss gradient operation 204 can compare the output data outn of layer n against reference output data refoutn to generate input data gradients din. The input data gradients din can measure a rate of difference between outn and refoutn with respect to each data element of output data outn. In some examples, an objective of the training is to minimize the difference between outn and refoutn such that the input data gradients din become close to zero.

Following the generation of input data gradients din by loss gradient operation 204, a backward propagation operation 206 can be performed for each neural network layer. For example, a backward propagation operation 206n can be performed at highest layer n, a backward propagation operation 206b can be performed at layer 2, a backward propagation operation 206a can be performed at layer 1. A backward propagation operation at a neural network layer can be based on the weights of that neural network layer, the data gradient input to that neural network layer, as well as the input to the forward propagation operation of that layer. For example, for layer n, backward propagation operation 206n can receive, as inputs, weights wn, input data outn-1 (from forward propagation operation at neural network layer n-1), and input data gradient din. The backward propagation operation can perform multiplication and summation computations on the input to generate output data gradients (dn-1, d2, d1, etc. in FIG. 2) and weight gradients wgrad (dwn, dw2, dw1, etc. in FIG. 2). The output data gradients can be forwarded to the next lower neural network layer as inputs to the backward propagation operation in that layer, whereas the weight gradients can represent changes to be applied to weights at a neural network layer.

The weights at layer n can be updated by an update operation 208 (e.g., update operation 208n for layer n) based on the weight gradients dwn based on the following equation:

$$wn' = wn - \alpha \times dwn$$

In this equation, wn' can refer to the updated weights wn, whereas a can include a set of pre-determined constants.

The output data gradients dn-1 generated by layer n can then propagate to the next lower neural network layer n-1 as input to the backward propagation operation at that layer. Backward propagation operation 202b of layer 2 can operate on data gradients d2, weights w2, and input data out1 to generate output data gradients d1 as well as weight gradients dw2. Weight gradients dw2 can be used by update operation 208b to update w2 weights. Data gradients d1 can propagate to layer 1. Backward propagation operation 202a of layer 1 can operate on data gradients d2, weights w1, and training input data to generate weight gradients dw1. Weight gradients dw1 can be used by update operation 208a to update w1 weights.

A training process performed on a single computing system can be very time-consuming due to the sequential nature of the training process. Specifically, as described above, in a training process a forward propagations is first performed at each neural network layer to compute training output data, and then a backward propagation is performed at each neural network layer to compute the weight gradients, which is then followed by the updating of the weights at each neural network layer. As the backward propagation operations depend on the forward propagation operations, the two sets of operations may not be performed in parallel.

Moreover, due to data dependency among the neural network layers, the forward propagation operations and the backward propagation operations also need to be performed sequentially for each neural network layer. The lack of parallelism can drastically increase the training time, which is further increased when multiple batches of the training process are performed for different portions of the training data, and the batches are repeated in multiple iterations to converge towards minimum data gradients.

As described above, one way to accelerate a training process is by using a distributed system, to distribute the training process across multiple computing devices, each of which can be configured as a worker node. Distributing the training process across multiple worker nodes can reduce the amount of training data to be processed at each worker node, which can reduce the time of completion of the forward and backward propagation operations and accelerate the training process. For example, as the volume of training data processed by each worker nodes has been reduced, the durations of the forward propagation operation and backward propagation operation can be shorter.

Figure 3:
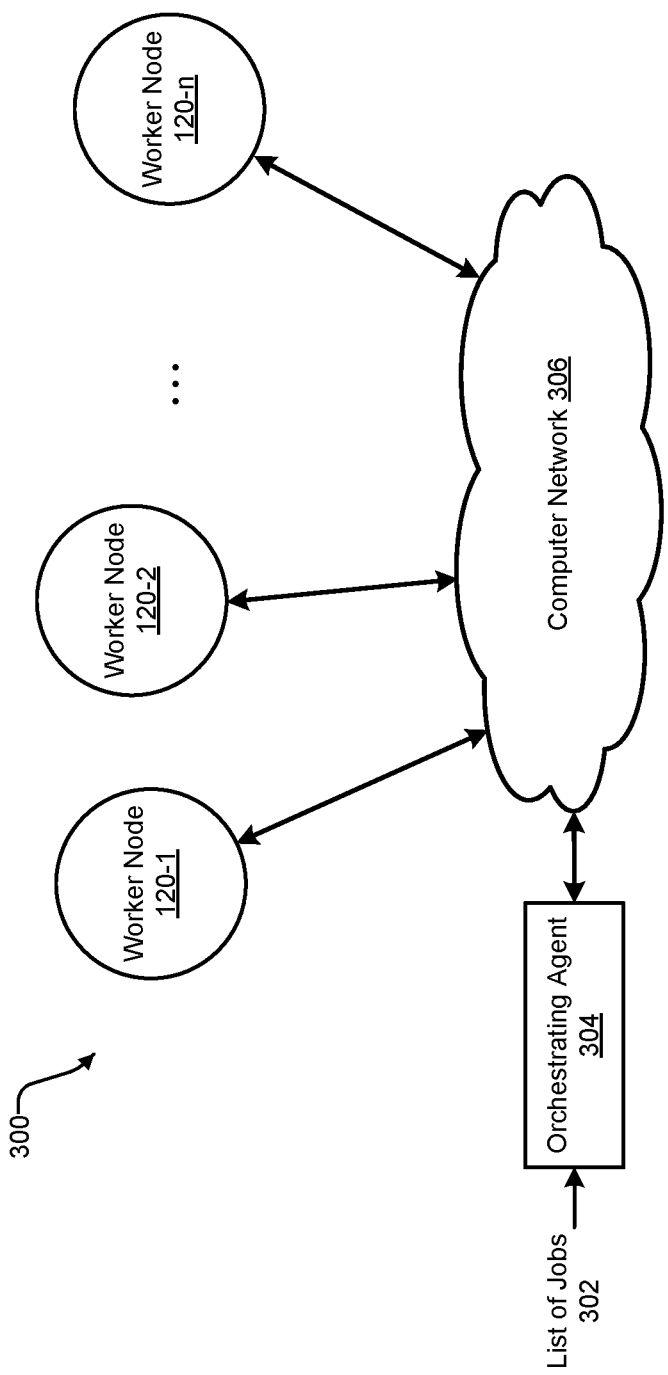
FIG. 3 illustrates an example distributed system that can perform a training process for a neural network.

FIG. 3 illustrates an example distributed system 300 that can perform a training process for a neural network, according to some implementations. As shown in FIG. 3, the distributed system 300 may include a number of worker nodes (e.g., computing devices) 120-1, 120-2, ... to 120-n, etc. Each worker node 120 can include a communication interface to communicate with each other via a computer network 306. Each worker node 120 can include computing resources to perform the operations of a training process including forward propagation operations, backward propagation operations, update weights operations, etc. The computing resources may include, for example, a neural network processor, neural network accelerator, a graphics processing unit (GPU), a field programmable gate array (FPGA), a processor or co-processor, an application specific integrated circuit (ASIC), and/or other suitable computing circuitry that support the arithmetic operations involved in the training process. Each worker node 120 can communicate, via computer network 306, with other worker nodes 120 to exchange weight gradients to perform exchange operations, and perform update weights operations after the exchange operations are completed.

The distributed system 300 may be initialized by an orchestrating agent 304. In one example, the orchestrating agent 304 may receive a list of jobs 302 that are to be performed. The orchestrating agent 304 may determine which of the worker nodes 120 are available to work on the list of jobs 302, select a number of the worker nodes 120 to work on the list of jobs 302, and provide instructions to each of the selected worker nodes 120 for the list of jobs 302 to be completed. The instructions provided to each of the selected worker nodes 120 may include the identity of other selected worker nodes and/or the identity of the next or previous worker node in a logical ring (for a logical ring topology). Upon completion of the list of jobs 302, the selected worker nodes 120 may alert the orchestrating agent 304 that they are available to work on any subsequent jobs.

Figure 4A:
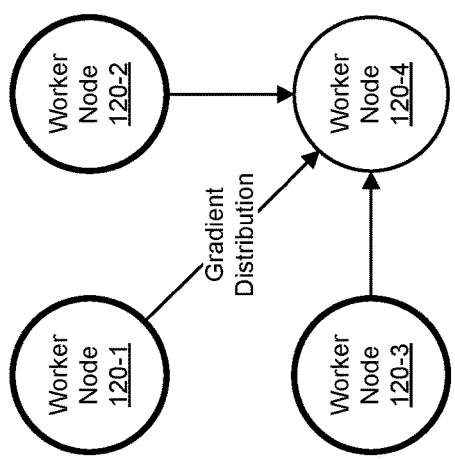
FIGS. 4A-4C illustrate various example training steps performed by a distributed system.
Figure 4B:
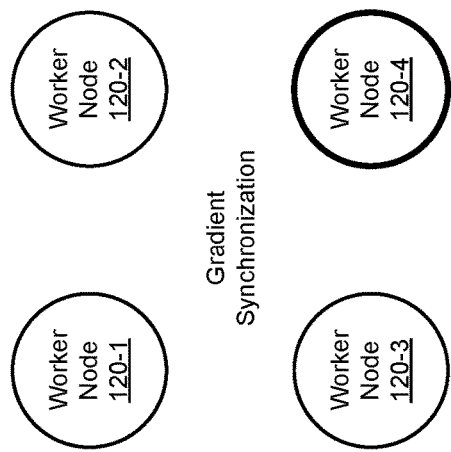
Figure 4C:
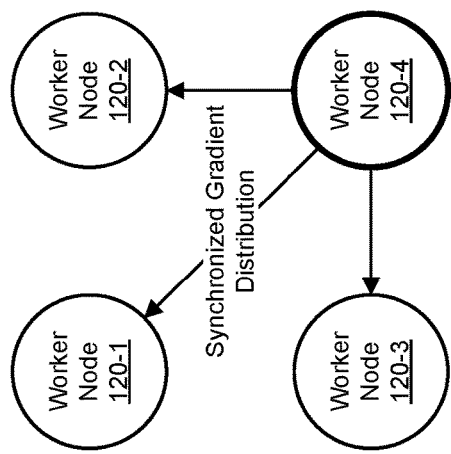

FIGS. 4A-4C illustrate various example training steps performed by a distributed system for a first synchronization scheme in which gradients are synchronized at a single worker node. As the gradients are computed by each of the worker nodes 120-1, 120-2, 120-3, the gradients are distributed to the worker node 120-4, as shown in FIG. 4A. Next, gradient synchronization is performed by the worker node 120-4, as shown in FIG. 4B. After the gradients are synchronized, they are distributed from the worker node 120-4 to each of the worker nodes 120-1, 120-2, and 120-3, as shown in FIG. 4C.

Figure 5A:
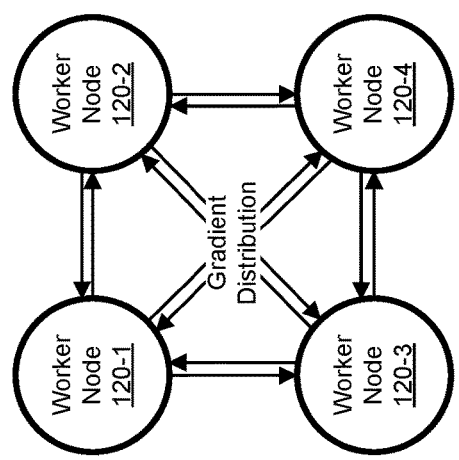
FIGS. 5A-5C illustrate various example training steps performed by a distributed system.
Figure 5B:
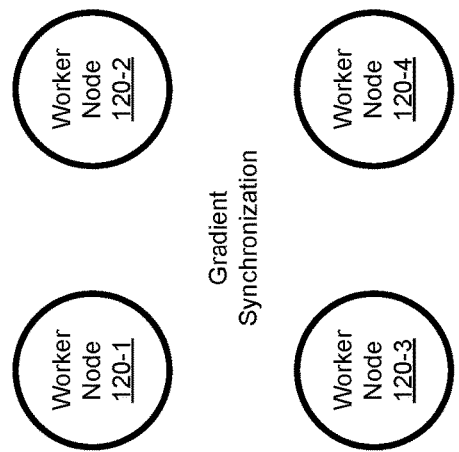
Figure 5C:
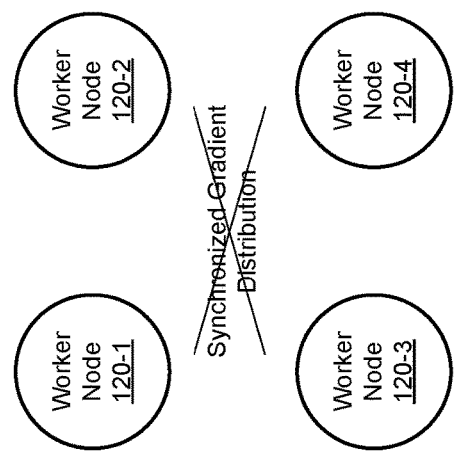

FIGS. 5A-5C illustrate various example training steps performed by a distributed system for a second synchronization scheme in which gradients are synchronized at each worker node. As the gradients are computed by each of the worker nodes 120-1, 120-2, 120-3, and 120-4, the gradients are exchanged throughout such that each worker node receives gradients from each other worker node, as shown in FIG. 5A. Next, gradient synchronization is performed by each of the worker nodes 120-1, 120-2, 120-3, and 120-4, as shown in FIG. 5B. Since each of the worker nodes 120-1, 120-2, 120-3, and 120-4 computes its own synchronized gradients, there is no distribution of synchronized gradients, as shown in FIG. 5C.

Figure 6A:
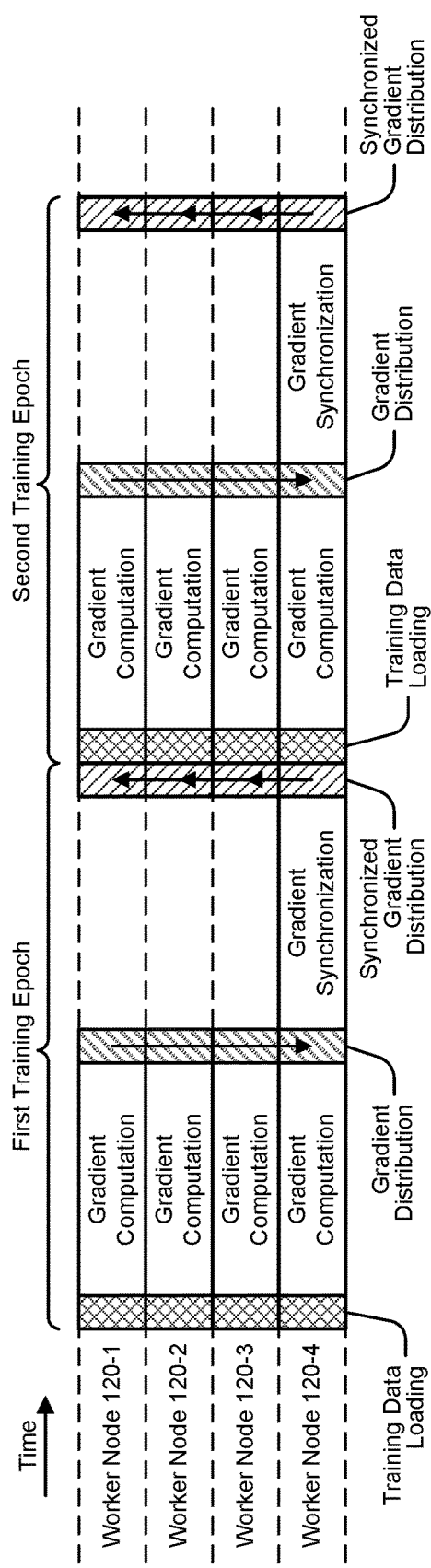
FIGS. 6A and 6B illustrate example timing diagrams corresponding to FIGS. 4A-4C and FIGS. 5A-5C, respectively.
Figure 6B:
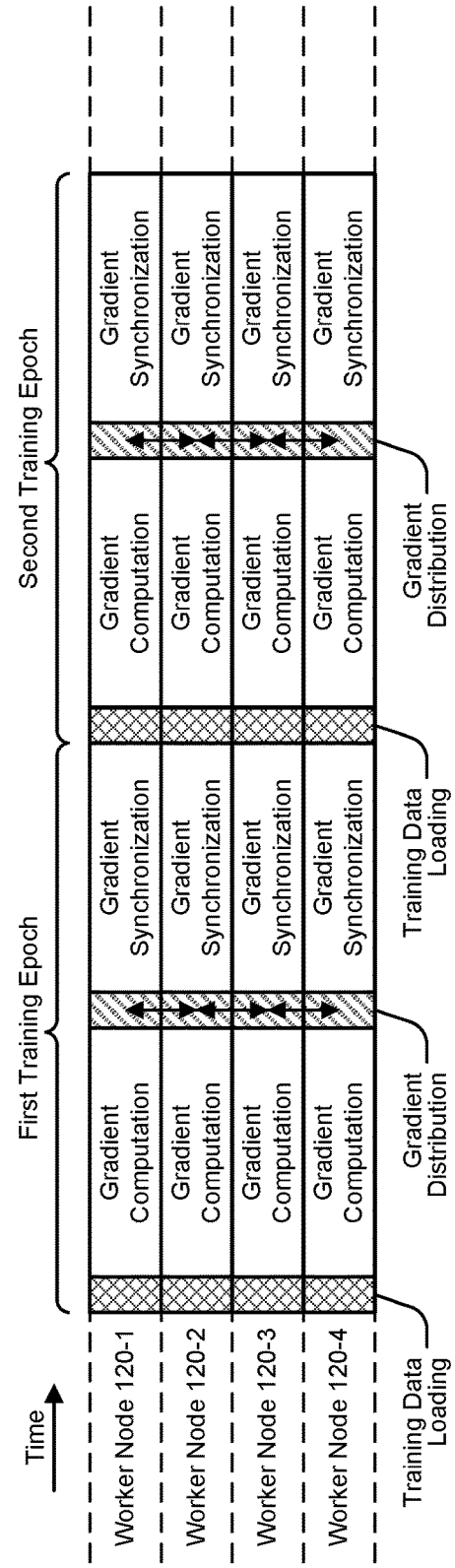

FIGS. 6A and 6B illustrate example timing diagrams corresponding to the first and second synchronization schemes illustrated in FIGS. 4A-4C and FIGS. 5A-5C, respectively. In the example shown in FIG. 6A, during a first training epoch, training data is loaded onto each of the worker nodes 120 (optionally worker node 120-4), gradients are computed by each of the worker nodes 120 (optionally worker node 120-4), the gradients are transmitted from the worker nodes 120-1, 120-2, and 120-3 to the worker node 120-4 (as indicated by the downward arrows) which synchronizes the received gradients (along with, optionally, the gradients computed by the worker node 120-4), and then the synchronized gradients are transmitted from the worker node 120-4 to the worker nodes 120-1, 120-2, and 120-3 (as indicated by the upward arrows). The weights associated with the neural network model are updated based on the synchronized gradients prior to a second training epoch, in which the same process is repeated.

In the example shown in FIG. 6B, during a first training epoch, training data is loaded onto each of the worker nodes 120, gradients are computed by each of the worker nodes 120, the gradients are transmitted (e.g., exchanged) between each of the worker nodes 120 (as indicated by the downward and upward arrows), and each of the worker nodes 120 synchronize the received gradients (along with the gradients computed at the particular worker node). The weights associated with the neural network model are updated based on the synchronized gradients prior to a second training epoch, in which the same process is repeated.

Figure 7A:
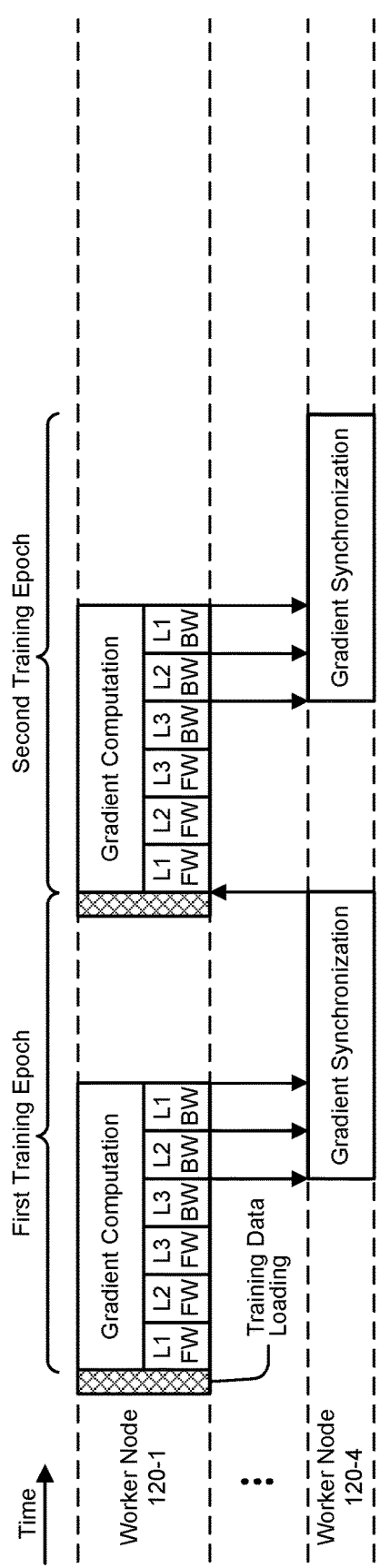
FIGS. 7A and 7B illustrate example timing diagrams corresponding to synchronization schemes for single-model and multiple-model neural network training, respectively.
Figure 7B:
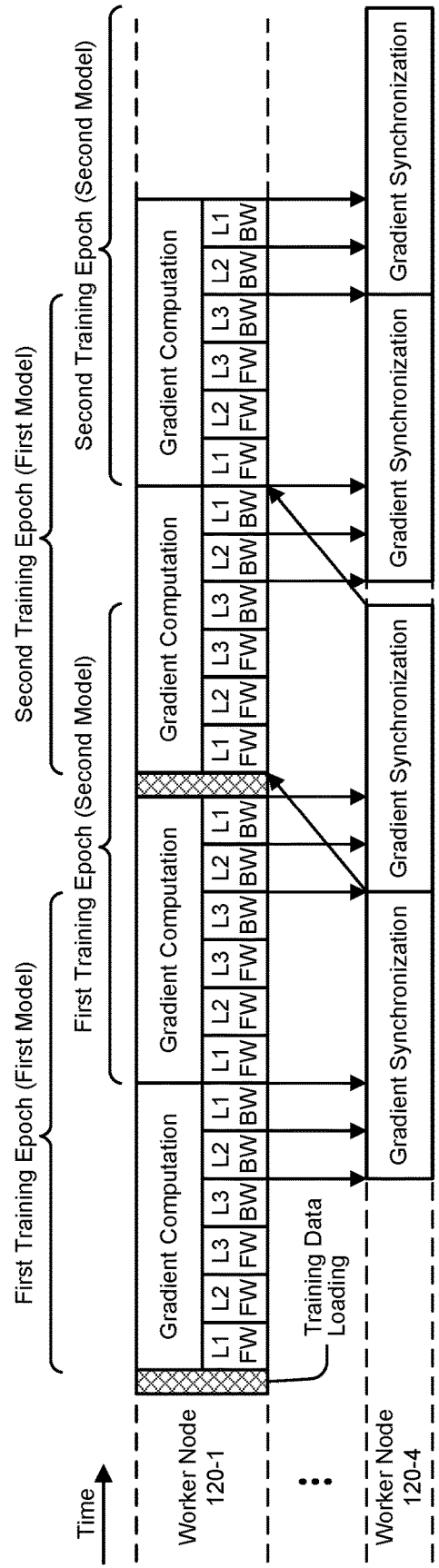

FIGS. 7A and 7B illustrate example timing diagrams corresponding to the first synchronization scheme for single-model and multiple-model neural network training, respectively. In the example shown in FIG. 7A, during a first training epoch, training data loaded onto the worker node 120-1 is used for training of a first neural network model having layers 1, 2, and 3. Next, gradients are computed by the worker node 120-1 by performing forward propagation operations for layers 1, 2, and 3, followed by backward propagation operations for layers 3, 2, and 1. As each of the gradients for each layer are computed and become available, they are transmitted from the worker node 120-1 to the worker node 120-4 (as indicated by the downward arrows). For example, the gradients for layer 3 are computed first and are then transmitted to the worker node 120-4, the gradients for layer 2 are computed next and are then transmitted to the worker node 120-4, and the gradients for layer 1 are computed last and are then transmitted to the worker node 120-4.

The worker node 120-4 synchronizes the gradients received from the worker node 120-1 with other received gradients as they are received. For example, the gradients for layer 3 are received first and are begun to be synchronized before layers 1 and 2, the gradients for layer 2 are received next and are begun to be synchronized after layer 3 but before layer 1, and the gradients for layer 1 are received last and are begun to be synchronized after layers 2 and 3. The synchronized gradients are transmitted from the worker node 120-4 to the worker nodes 120-1 (as indicated by the upward arrow). The weights associated with the first neural network model are updated based on the synchronized gradients prior to a second training epoch, in which the same process is repeated.

In the example shown in FIG. 7B, a second neural network model is trained concurrently with the first neural network model. In various implementations, the two neural network models may be different models having different architectures and/or different numbers of layers. In the example shown in FIG. 7B, training data loaded onto the worker node 120-1 is used for training of the first neural network model having layers 1, 2, and 3 and the second neural network model having layers 1, 2, and 3. Similar to that described in reference to FIG. 7A, gradients are computed by the worker node 120-1 by performing forward propagation operations for layers 1, 2, and 3, followed by backward propagation operations for layers 3, 2, and 1. As each of the gradients for each layer are computed and become available, they are transmitted from the worker node 120-1 to the worker node 120-4 (as indicated by the downward arrows).

The worker node 120-4 synchronizes the gradients for the first neural network model received from the worker node 120-1 with other received gradients as they are received, as described in reference to FIG. 7A. While the worker node 120-4 is synchronizing the gradients for the first neural network model, the worker node 120-1 may load the weights associated with the second neural network model and begin to compute gradients for the model. For example, while the worker node 120-4 is synchronizing the gradients for the first neural network model, the worker node 120-1 may perform forward propagation operations for layers 1, 2, and 3 of the second neural network model using the same training data that was used for the first neural network model. Accordingly, additional training data may not need to be loaded onto worker node 120-1 for training the second neural network model. Next, while the worker node 120-4 is still synchronizing the gradients for the first neural network model, the worker node 120-1 may perform backward propagation operations for layer 3.

As the gradients for layer 3 of the second neural network model are transmitted from the worker node 120-1 to the worker node 120-4, the worker node 120-4 may complete synchronizing the gradients for the first neural network model and may transmit the synchronized gradients to the worker node 120-1. Upon receiving the gradients for layer 3 of the second neural network model, the worker node 120-4 may synchronize these gradients while the worker node 120-1 computes the gradients for layer 2 of the second neural network model. Upon receiving the gradients for layer 2 of the second neural network, the worker node 120-4 may synchronize these gradients while the worker node 120-1 computes the gradients for layer 1 of the second neural network model. After the worker node 120-1 transmits the gradients for each of the layers of the second neural network model to the worker node 120-4, new training data is loaded onto the worker node 120-1 and the above steps are repeated during a second training epoch.

Figure 8A:
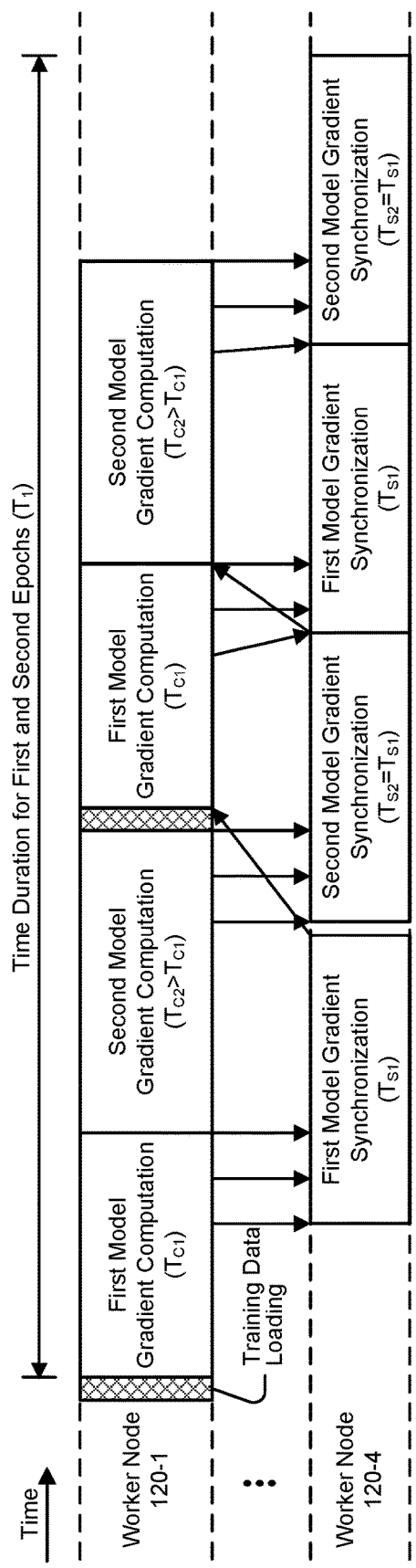
FIGS. 8A and 8B illustrate example timing diagrams for multiple-model neural network training.
Figure 8B:
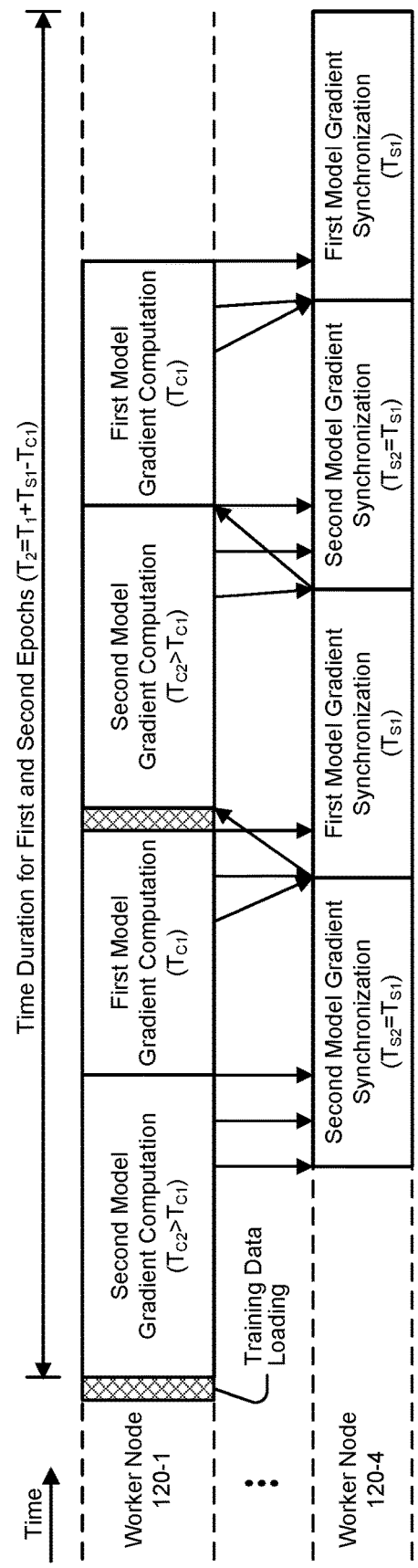

FIGS. 8A and 8B illustrate example timing diagrams for multiple-model neural network training. FIGS. 8A and 8B show the increased efficiency that can be achieved by ordering the training of the neural network models based on their gradient computation times. In the illustrated examples, the first model gradient computation time $T_{C1}$ is less than the second model gradient computation time $T_{C2}$, and the first model gradient synchronization time $T_{S1}$ is equal to the second model gradient synchronization time $T_{S2}$. As shown in the illustrated examples, by ordering the first neural network model prior to the second neural network model, the time duration for performing the first and second epochs of training can decrease by $T_{S1}-T_{C1}$.

FIGS. 9A and 9B illustrate additional example timing diagrams for multiple-model neural network training in a scenario in which the first model gradient computation time $T_{C1}$ is equal to the second model gradient computation time $T_{C2}$, and the first model gradient synchronization time $T_{S1}$ is less than the second model gradient synchronization time $T_{S2}$. As shown in the illustrated examples, by ordering the second neural network model prior to the first neural network model, the time duration for performing the first and second epochs of training can decrease by $T_{C1}-T_{S1}$.

FIGS. 10A and 10B illustrate additional example timing diagrams for multiple-model neural network training in a scenario in which the first model gradient computation time $T_{C1}$ is less than the second model gradient computation time $T_{C2}$, and both the computation times $T_{C1}$ and $T_{C2}$ are much greater than both the synchronization times $T_{S1}$ and $T_{S2}$. As shown in the illustrated examples, ordering the neural network models has no effect on the time durations for performing the first and second epochs of training.

Figure 11:
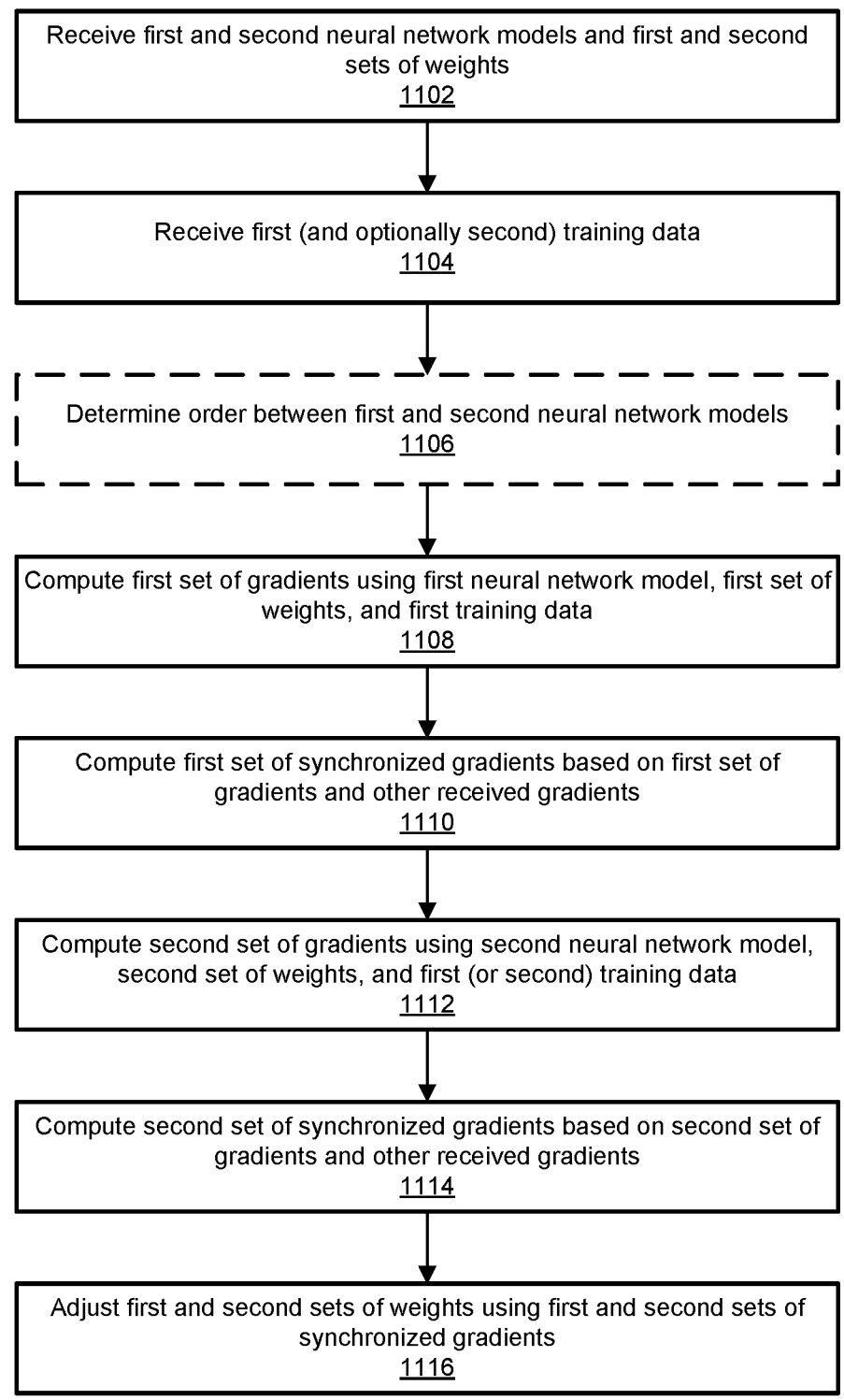
FIG. 11 illustrates a method of concurrently training neural network models using a distributed system.

FIG. 11 illustrates a method 1100 of concurrently training neural network models using a distributed system. One or more steps of the method 1100 may be omitted during performance of the method 1100, and steps of the method 1100 need not be performed in the order shown. One or more steps of the method 1100 may be performed by one or more processors. The method 1100 may be implemented as a computer-readable medium or computer program product comprising instructions which, when the program is executed by one or more computers, cause the one or more computers to carry out the steps of the method 1100. Such computer program products can be transmitted, over a wired or wireless network, in a data carrier signal carrying the computer program product.

At step 1102, a first neural network model and a second neural network model are received at a first worker node of a distributed system. Further at step 1102, a first set of weights associated with the first neural network model and a second set of weights associated with the second neural network model may be received at the first worker node. In some examples, the first neural network model is the same as the second neural network model. In some examples, the first neural network model has a different architecture than the second neural network model. For example, the first neural network model have a different number of layers than the second neural network model.

At step 1104, first training data is received at the first worker node. The first training data may include training input data and corresponding reference output data. The first training data may be used to train the first and the second neural network models. Further at step 1104, second training data may optionally be received at the first worker node. The second training data may be used to train the second neural network model.

At step 1106, an order in which the first and second neural network models are to be trained is determined. In some implementations, it may be determined to order the first neural network model prior to the second neural network model if it is determined that the gradient computation time associated with the first neural network model is less than the gradient computation time associated with the second neural network model, as described in reference to FIGS. 8A and 8B. In some implementations, it may be determined to order the first neural network model after to the second neural network model if it is determined that the gradient synchronization time associated with the first neural network model is less than the gradient synchronization time associated with the second neural network model, as described in reference to FIGS. 9A and 9B.

At step 1108, a first set of gradients are computed at the first worker node. The first set of gradients may be computed using the first neural network model, the first set of weights, and the first training data. The first set of gradients may include gradients for a first layer of the first neural network model, gradients for a second layer of the first neural network model, and gradients for a third layer of the first neural network model. The gradients for the third layer may be computed first, the gradients for the second layer may be computed next, and the gradients for the third layer may be computed last.

The first set of gradients may be transmitted from the first worker node to a second worker node over a network as each of the first set of gradients is computed. For example, the gradients for the third layer of the first neural network model may be transmitted first, the gradients for the second layer of the first neural network model may be transmitted next, and the gradients for the first layer of the first neural network model may be transmitted last.

At step 1110, a first set of synchronized gradients are computed at the second worker node based on the first set of gradients received and other received gradients. The first set of synchronized gradients may be computed as each of the first set of gradients is received. For example, synchronized gradients for the third layer of the first neural network model may be computed first, synchronized gradients for the second layer of the first neural network model may be computed next, and synchronized gradients for the first layer of the first neural network model may be computed last.

In some implementations, step 1110 may be performed concurrently with step 1108 such that at least one operation of step 1110 is performed simultaneously with at least one operation of step 1108. For example, the synchronized gradients for the third layer of the first neural network model may be computed simultaneously with the gradients for the second layer of the first neural network model.

At step 1112, a second set of gradients are computed at the first worker node. The second set of gradients may be computed using the second neural network model, the second set of weights, and the first training data (or optionally the second training data). The second set of gradients may include gradients for a first layer of the second neural network model, gradients for a second layer of the second neural network model, and gradients for a third layer of the second neural network model. The gradients for the third layer may be computed first, the gradients for the second layer may be computed next, and the gradients for the third layer may be computed last.

The second set of gradients may be transmitted from the first worker node to the second worker node over the network as each of the second set of gradients is computed. For example, the gradients for the third layer of the second neural network model may be transmitted first, the gradients for the second layer of the second neural network model may be transmitted next, and the gradients for the first layer of the second neural network model may be transmitted last.

In some implementations, step 1112 may be performed concurrently with step 1110 such that at least one operation of step 1112 is performed simultaneously with at least one operation of step 1110. For example, the gradients for the third layer of the second neural network model may be computed simultaneously with the synchronized gradients for the first layer of the first neural network model.

At step 1114, a second set of synchronized gradients are computed at the second worker node based on the second set of gradients received and other received gradients. The second set of synchronized gradients may be computed as each of the second set of gradients is received. For example, synchronized gradients for the third layer of the second neural network model may be computed first, synchronized gradients for the second layer of the second neural network model may be computed next, and synchronized gradients for the first layer of the second neural network model may be computed last.

In some implementations, step 1114 may be performed concurrently with step 1112 such that at least one operation of step 1114 is performed simultaneously with at least one operation of step 1112. For example, the synchronized gradients for the third layer of the second neural network model may be computed simultaneously with the gradients for the second layer of the second neural network model.

At step 1116, the first set of weights may be adjusted based on the first set of synchronized gradients. Further at step 1116, the second set of weights may be adjusted based on the second set of synchronized gradients. Step 1116 may be performed concurrently or after step 1110 and/or concurrently or after step 1114.

Figure 12:
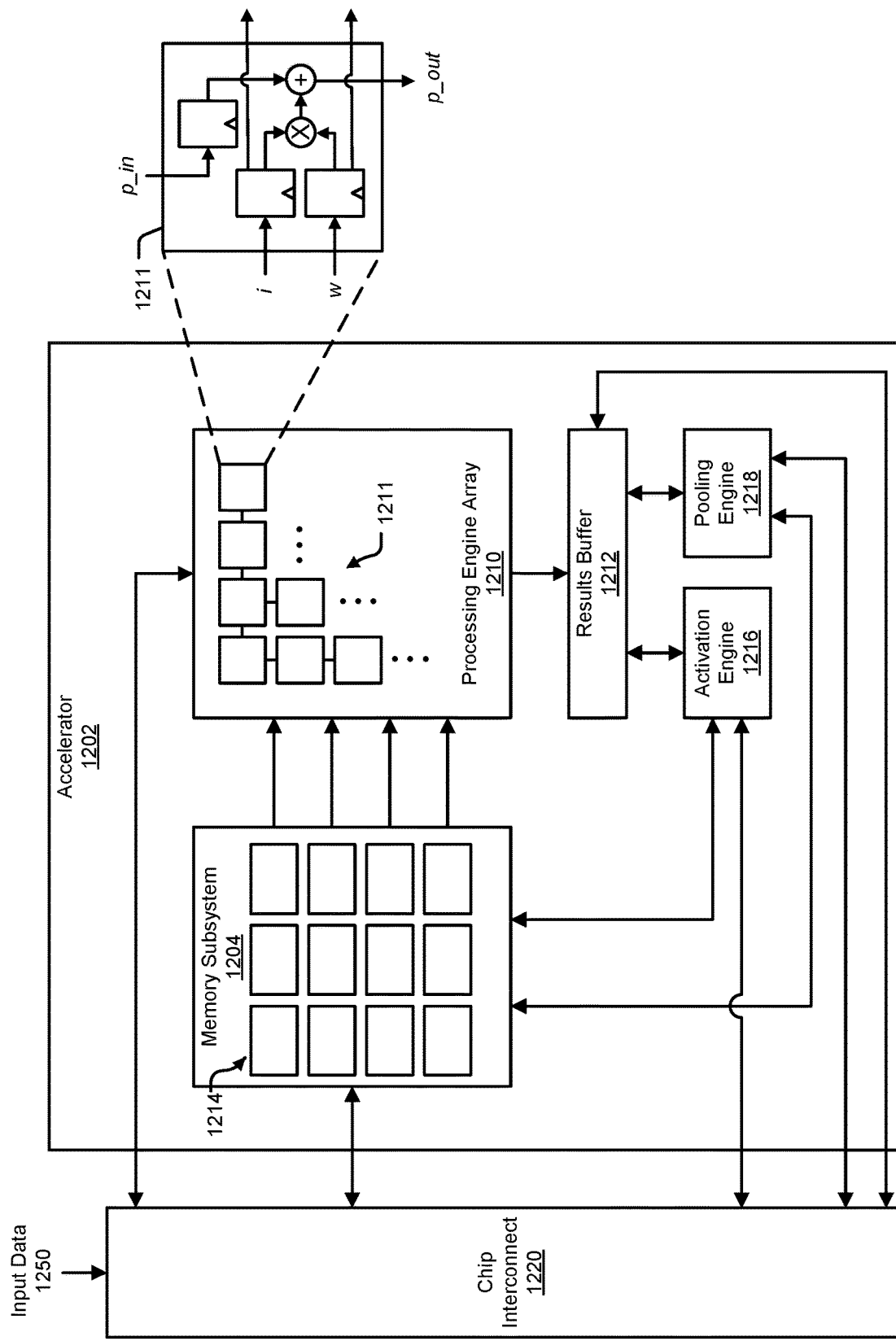
FIG. 12 illustrates an example of an accelerator.

FIG. 12 illustrates an example of an accelerator 1202 that may be an integrated circuit component of a processor, such as a neural network processor. The processor may have other integrated circuit components, including additional accelerator engines. In various examples, the accelerator 1202, for a set of input data (e.g., input data 1250), can execute computations using a processing engine array 1210, an activation engine 1216, and/or a pooling engine 1218.

In various implementations, the memory subsystem 1204 can include multiple memory banks 1214. In these implementations, each memory bank 1214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1204 can permit simultaneous access to the read or write channels of multiple memory banks. As another example, the memory subsystem 1204 can include arbitration logic such that arbitration between, for example, the outputs of multiple memory banks 1214 can result in more than one memory bank's output being used. In these and other examples, though globally managed by the memory subsystem 1204, each memory bank can be operated independently of any other.

Having the memory banks 1214 be independently accessible can increase the efficiency of the accelerator 1202. For example, values can be simultaneously read and provided to each row of the processing engine array 1210, so that the entire processing engine array 1210 can be in use in one clock cycle. As another example, the memory banks 1214 can be read at the same time that results computed by the processing engine array 1210 are written to the memory subsystem 1204. In contrast, a single memory may be able to service only one read or write at a time. With a single memory, multiple clock cycles can be required, for example, to read input data for each row of the processing engine array 1210 before the processing engine array 1210 can be started.

In various implementations, the memory subsystem 1204 can be configured to simultaneously service multiple clients, including the processing engine array 1210, the activation engine 1216, the pooling engine 1218, and any external clients that access the memory subsystem 1204 over a communication fabric 1220. In some implementations, being able to service multiple clients can mean that the memory subsystem 1204 has at least as many memory banks as there are clients. In some cases, each row of the processing engine array 1210 can count as a separate client. In some cases, each column of the processing engine array 1210 can output a result, such that each column can count as a separate write client. In some cases, output from the processing engine array 1210 can be written into the memory banks 1214 that can then subsequently provide input data for the processing engine array 1210. As another example, the activation engine 1216 and the pooling engine 1218 can include multiple execution channels, each of which can be separate memory clients. The memory banks 1214 can be implemented, for example, using static random access memory (SRAM).

In various implementations, the memory subsystem 1204 can include control logic. The control logic can, for example, keep track of the address spaces of each of the memory banks 1214, identify memory banks 1214 to read from or write to, and/or move data between the memory banks 1214. In some implementations, memory banks 1214 can be hardwired to particular clients. For example, a set of memory banks 1214 can be hardwired to provide values to the rows of the processing engine array 1210, with one memory bank servicing each row. As another example, a set of memory banks can be hard wired to receive values from columns of the processing engine array 1210, with one memory bank receiving data for each column.

The processing engine array 1210 is the computation matrix of the example accelerator 1202. The processing engine array 1210 can, for example, execute parallel integration, convolution, correlation, and/or matrix multiplication, among other things. The processing engine array 1210 includes multiple processing engines 1211, arranged in rows and columns, such that results output by one processing engine 1211 can be input directly into another processing engine 1211. Processing engines 1211 that are not on the outside edges of the processing engine array 1210 thus can receive data to operate on from other processing engines 1211, rather than from the memory subsystem 1204.

In various examples, the processing engine array 1210 uses systolic execution, in which data arrives at each processing engine 1211 from different directions at regular intervals. In some examples, input data can flow into the processing engine array 1210 from the left and weight values can be loaded at the top. In some examples weights and input data can flow from the left and partial sums can flow from top to bottom. In these and other examples, a multiply-and-accumulate operation moves through the processing engine array 1210 as a diagonal wave front, with data moving to the right and down across the array. Control signals can be input at the left at the same time as weights, and can flow across and down along with the computation.

In various implementations, the number of columns in the processing engine array 1210 determines the computational capacity of the processing engine array 1210, and the number of rows determines the required memory bandwidth for achieving maximum utilization of the processing engine array 1210. The processing engine array 1210 can have, for example, 64 columns and 428 rows, or some other number of columns and rows.

An example of a processing engine 1211 is illustrated in FIG. 12 in an inset diagram. As illustrated by this example, a processing engine 1211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1211.

In the illustrated example, an input from above can include a partial sum, p_in, provided either from another processing engine 1211 or from a previous round of computation by the processing engine array 1210. When starting a computation for a new set of input data, the top row of the processing engine array 1210 can receive a fixed value for p_in, such as zero. As illustrated by this example, i and w are multiplied together and the result is summed with p_in to produce a new partial sum, p_out, which can be input into another processing engine 1211. Various other implementations of the processing engine 1211 are possible.

Outputs from the last row in the processing engine array 1210 can be temporarily stored in the results buffer 1212. The results can be intermediate results, which can be written to the memory banks 1214 to be provided to the processing engine array 1210 for additional computation. Alternatively, the results can be final results, which, once written to the memory banks 1214 can be read from the memory subsystem 1204 over the communication fabric 1220, to be output by the system.

In some implementations, the accelerator 1202 includes an activation engine 1216. In these implementations, the activation engine 1216 can combine the results from the processing engine array 1210 into one or more output activations. For example, for a convolutional neural network, convolutions from multiple channels can be summed to produce an output activation for a single channel. In other examples, accumulating results from one or more columns in the processing engine array 1210 may be needed to produce an output activation for a single node in the neural network. In some examples, activation engine 1216 can be bypassed.

In various examples, the activation engine 1216 can include multiple separate execution channels. In these examples, the execution channels can correspond to the columns of the processing engine array 1210, and can perform an operation on the outputs of a column, the result of which can be stored in the memory subsystem 1204. In these examples, the activation engine 1216 may be able to perform between 1 and n parallel computations, where n is equal to the number of columns in the processing engine array 1210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1202 can include a pooling engine 1218. Pooling is the combining of outputs of the columns of the processing engine array 1210. Combining can include for example, computing a maximum value, a minimum value, an average value, a median value, a summation, a multiplication, or another logical or mathematical combination. In various examples, the pooling engine 1218 can include multiple execution channels that can operating on values from corresponding columns of the processing engine array 1210. In these examples, the pooling engine 1218 may be able to perform between 1 and n parallel computations, where n is equal to the number of columns in the processing engine array 1210. In various examples, execution channels of the pooling engine 1218 can operate in parallel and/or simultaneously. In some examples, the pooling engine 1218 can be bypassed.

Herein, the activation engine 1216 and the pooling engine 1218 may be referred to collectively as execution engines. The processing engine array 1210 is another example of an execution engine. Another example of an execution engine is a Direct Memory Access (DMA) engine, which may be located outside the accelerator 1202.

Input data 1250 can arrive over the communication fabric 1220. The communication fabric 1220 can connect the accelerator 1202 to other components of a processor, such as a DMA engine that can obtain input data 1250 from an Input/Output (I/O) device, a storage drive, or a network interface. The input data 1250 can be, for example one-dimensional data, such as a character string or numerical sequence, or two-dimensional data, such as an array of pixel values for an image or frequency and amplitude values over time for an audio signal. In some examples, the input data 1250 can be three-dimensional, as may be the case with, for example, the situational information used by a self-driving car or virtual reality data. In some implementations, the memory subsystem 1204 can include a separate buffer for the input data 1250. In some implementations, the input data 1250 can be stored in the memory banks 1214 when the accelerator 1202 receives the input data 1250.

In some examples, the accelerator 1202 can implement a neural network processing engine. In these examples, the accelerator 1202, for a set of input data 1250, can execute a neural network to perform a task for which the neural network was trained. Executing a neural network on a set of input data can be referred to as inference or performing inference.

The weights for the neural network can be stored in the memory subsystem 1204, along with input data 1250 on which the neural network will operate. The neural network can also include instructions, which can program the processing engine array 1210 to perform various computations on the weights and the input data. The instructions can also be stored in the memory subsystem 1204, in the memory banks 1214 or in a separate instruction buffer. The processing engine array 1210 can output intermediate results, which represent the outputs of individual layers of the neural network. In some cases, the activation engine 1216 and/or pooling engine 1218 may be enabled for computations called for by certain layers of the neural network. The accelerator 1202 can store the intermediate results in the memory subsystem 1204 for inputting into the processing engine array 1210 to compute results for the next layer of the neural network. The processing engine array 1210 can further output final results from a last layer of the neural network. The final results can be stored in the memory subsystem 1204 and then be copied out to host processor memory or to another location.

Figure 13:
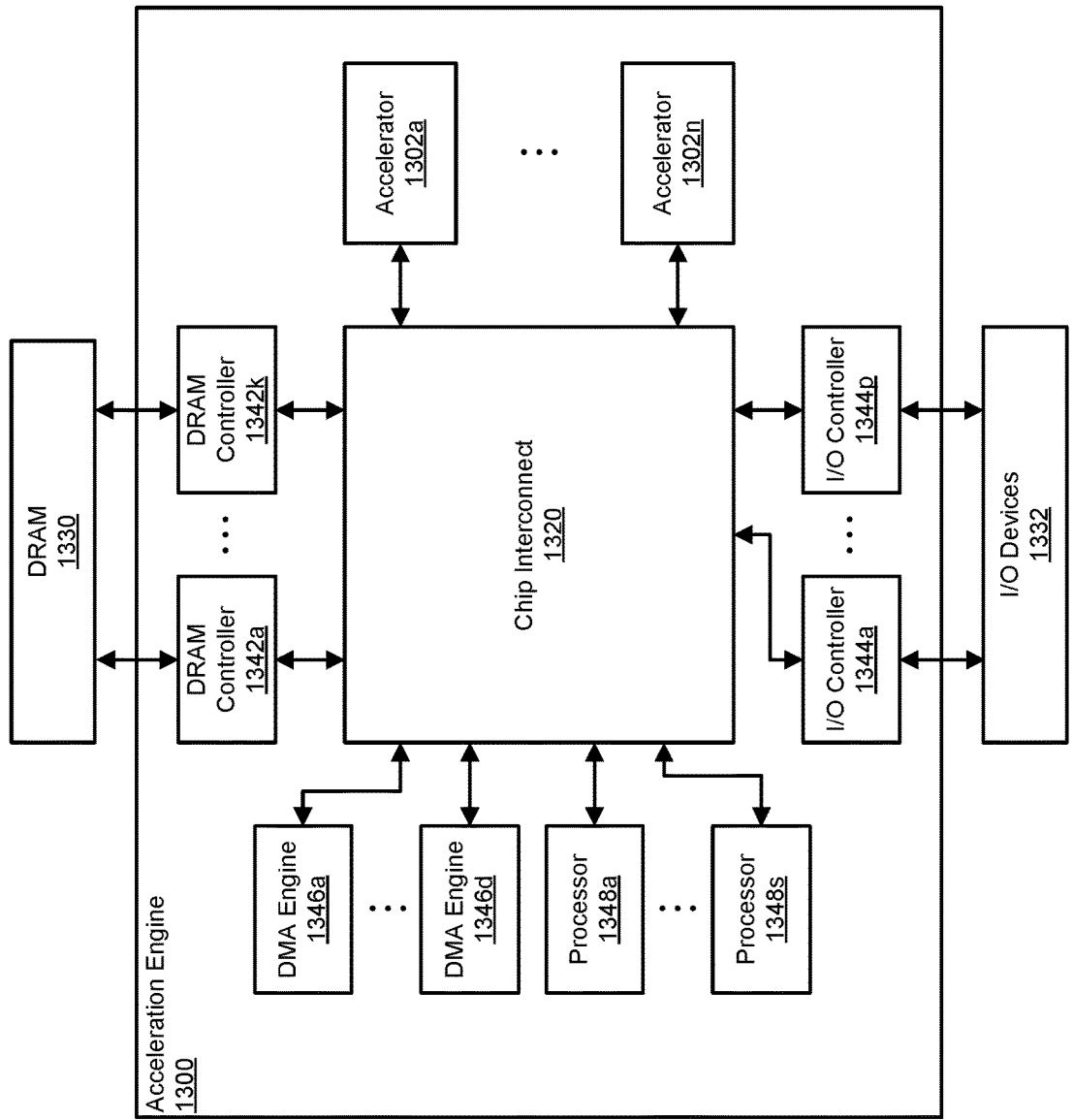
FIG. 13 illustrates an example of an acceleration engine.

FIG. 13 illustrates an example of an acceleration engine 1300. The acceleration engine 1300 is an example of an integrated circuit that can include one or more accelerators 1302a-1302n that may be similar to the accelerator illustrated in FIG. 12.

In the example of FIG. 13, the acceleration engine 1300 includes multiple accelerators 1302a-1302n, each of which can perform a set of operations. In various examples, the accelerators 1302a-1302n are for particular types of operations, so that the accelerators 1302a-1302n can perform the operations much faster than when similar operations are performed by a general purpose processor. In various examples, to perform a set of operations, input data on which the operations are to be performed must first be moved into the accelerators 1302a-1302n. Additionally, in some cases, program code is also moved into the accelerators 1302a-1302n, which programs the operations that the accelerators 1302a-1302n will perform on the data. In the illustrated example, the acceleration engine 1300 includes n accelerators 1302a-1302n. Examples of accelerators that can be included in the acceleration engine 1300 include graphics accelerators, floating point accelerators, neural network accelerators, and others. In various examples, the accelerators 1302a-1302n can each be the same (e.g., each of the is a graphics accelerator) or can be different (e.g., the accelerators 1302a-1302n include a graphics accelerator, a floating point accelerator, and neural network accelerator).

The example acceleration engine 1300 further includes DRAM controllers 1342a-1342k for communicating with an external memory. The external memory is implemented, in this example, using DRAM 1330. In the illustrated example, the acceleration engine 1300 includes k DRAM controllers 1342a-1342k, each of which may be able to communicate with an independent set of banks of DRAM. In other examples, other types of RAM technology can be used for the external memory. The DRAM controllers 1342a-1342k can also be referred to as memory controllers.

In various examples, input data and/or program code for the accelerators 1302a-1302n can be stored in the DRAM 1330. Different programs can cause the accelerators 1302a-1302n to perform different operations. For example, when one of the accelerators is a neural network accelerator, one program can configure the neural network accelerator to perform speech recognition while another program can configure the neural network accelerator to perform image recognition. In various examples, different accelerators 1302a-1302n can be programmed with different programs, so that each performs a different set of operations. In various examples, the processors 1348a-1348s can manage moving of program code from the DRAM 1330 to the accelerators 1302a-1302n.

The example acceleration engine 1300 further includes I/O controllers 1344a-1344p for communicating with I/O devices 1332 in the system. The acceleration engine 1300 can communicate with I/O devices over, for example, a processor bus. In some examples, the processor bus can be implemented using Peripheral Component Interconnect (PCI) and/or a variation of the PCI bus protocol. The processor bus can connect the acceleration engine 1300 to I/O devices such as, for example, input and output devices, memory controllers, storage devices, and/or network interface cards, among other things. In some examples, the I/O controllers 1344-1344p can enable the acceleration engine 1300 to act as an I/O device for a host processor. For example, the acceleration engine 1300 can be the recipient of input data from the host processor, and a command indicating an operation to be performed on the input data (e.g., a particular computation or analysis). In the illustrated example, the acceleration engine 1300 includes p I/O controllers 1344a-1344p, each of which may include a separate root complex and may communicate with a separate set of I/O devices 1332. In other examples, other standardized bus protocols, such as Ultra Path Interconnect (UPI) can be used for the host bus. In other examples, a proprietary bus protocol can be used.

Movement of data in the acceleration engine 1300 can be managed by one or more processors 1348a-1348s, which can also be referred to as data management processors. In the example of FIG. 13, the acceleration engine 1300 includes s processors 1348a-1348s incorporated into the device (e.g., on the same silicon die). In other examples, the processors 1348a-1348s can be external to the acceleration engine 1300 (e.g., on a different die and/or in a different package). In some examples, the processors 1348a-1348s can manage the movement of data from I/O devices 1332 to the accelerators 1302a-1302n or the DRAM 1330. For example, input data may be located at an I/O device 1332 or in processor memory, and the processors 1348a-1348s can move the input from the I/O device 1332 or processor memory into an accelerator or into DRAM 1330. As another example, program code for the accelerators 1302a-1302n may be located on an I/O device 1332 or in processor memory.

The example acceleration engine 1300 further includes DMA engines 1346a-1346d that can move data between the accelerators 1302a-1302n, DRAM controllers 1342a-1342k, and I/O controllers 1344a-1344p. In the illustrated example, the acceleration engine 1300 includes d DMA engines 1346a-1346d. In some implementations, the DMA engines 1346a-1346d can be assigned to specific tasks, such as moving data from the DRAM controllers 1342a-1342d to the accelerators 1302a-1302n, or moving data between the I/O controllers 1344a-1344p and the accelerators 1302a-1302n. These tasks can be assigned, for example, by enqueueing descriptors with the DMA engines 1346a-1346d, where a descriptor identifies an address for a block of data and an operation (e.g., a read or a write) to perform. A descriptor, for example, can direct a DMA engine to instruct a DMA controller to read a block of data from DRAM 1330. A descriptor can, as a further example, instruct the DMA engine to write data, read by the DMA controller, to an accelerator. Further descriptors can be used to move data from an accelerator to DRAM 1330.

In various examples, each of the processors 1348a-1348s can be responsible for managing the data movement for a different accelerator. In some examples, a processor may manage the data movement for more than one accelerator. Similarly, in various examples, each of the processors 1348a-1348s can be assigned to one or more DMA engines 1346a-1346d. In these and other examples, associations between processors 1348a-1348s, accelerators 1302a-1302n, and DMA engines 1346a-1346d are determined by program code being executed by each respective processor.

In the example acceleration engine 1300, the various components can communicate over a chip interconnect 1320. The chip interconnect 1320 primarily includes wiring for routing data between the components of the acceleration engine 1300. In some cases, the chip interconnect 1320 can include a minimal amount of logic, such as multiplexors to control the direction of data, flip-flops for handling clock domain crossings, and timing logic.

Figure 14:
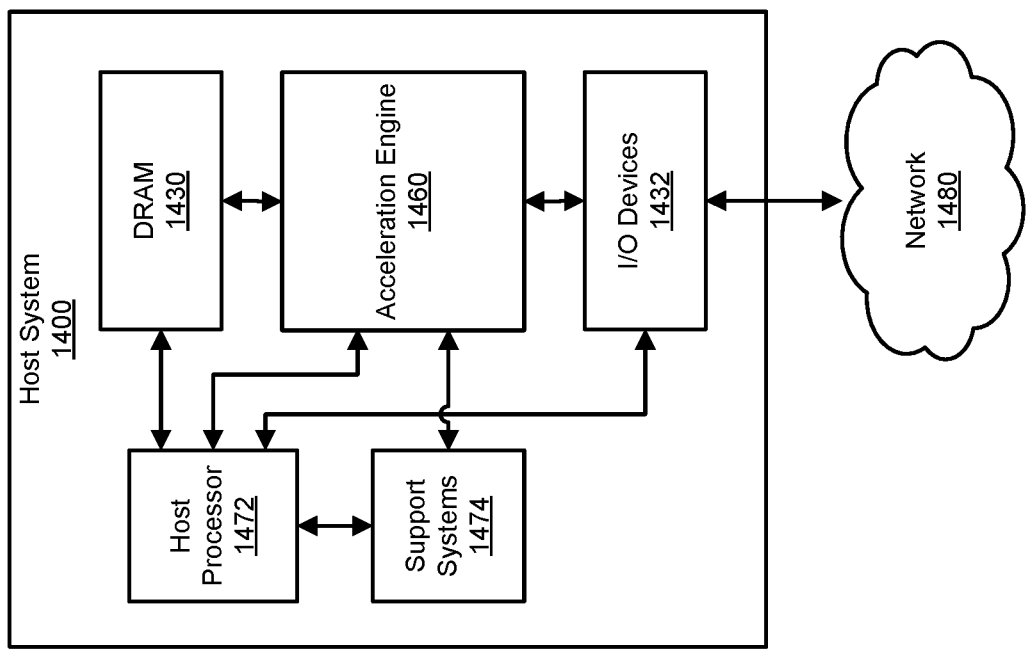
FIG. 14 illustrates an example of a host system.

FIG. 14 illustrates an example of a host system 1400 in which an acceleration engine 1460 can be used. The acceleration engine 1460 of FIG. 14 is an example of a device that can include one or more accelerators such as is illustrated in FIG. 13. The example host system 1400 of FIG. 14 includes the acceleration engine 1460, a host processor 1472, DRAM 1430 or processor memory, I/O devices 1432, and support systems 1474. In various implementations, the host system 1400 can include other hardware that is not illustrated here.

The host processor 1472 is a general purpose integrated circuit that is capable of executing program instructions. In some examples, the host processor 1472 can include multiple processing cores. A multi-core processor may include multiple processing units within the same processor. In some examples, the host system 1400 can include more than one host processor 1472. In some examples, the host processor 1472 and the acceleration engine 1460 can be one chip, such as, one or more integrated circuits within the same package.

In various examples, the host processor 1472 can communicate with other components in the host system 1400 over one or more communication channels. For example, the host system 1400 can include a host processor bus, which the host processor 1472 can use to communicate with the DRAM 1430, for example. As another example, the host system 1400 can include an I/O bus, such as a PCI-based bus, over which the host processor 1472 can communicate with the acceleration engine 1460 and/or the I/O devices 1432, for example. In various examples, the host system 1400 can, alternatively or additionally, include other communication channels or busses, such as serial busses, power management busses, storage device busses, and so on.

In some examples, software programs executing on the host processor 1472 can receive or generate input for processing by the acceleration engine 1460. In some examples, the programs can select an appropriate neural network to execute for a given input. For example, a program may be for language translation, and can select one or more neural networks capable of speech recognition and/or machine translation. In these and other examples, the programs can configure the acceleration engine 1460 with the neural network to execute, and/or can select a neural network processing engine on the acceleration engine 1460 that has previously been configured to execute the desired neural network. In some examples, once the acceleration engine 1460 has started an inference on input data, the host processor 1472 can manage the movement of data (such as weights, instructions, intermediate results, results of conditional layers, and/or final results) into or out of the acceleration engine 1460.

In some examples, a software program that is using the acceleration engine 1460 to conduct an inference can read the result from a conditional layer from the acceleration engine 1460 and/or from a storage location, such as in DRAM 1430. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1430 is memory that is used by the host processor 1472 for storage of program code that the host processor 1472 is in the process of executing, as well as values that are being operated on. In some examples, the data for a neural network (e.g., weight values, instructions, and other data) can be all or partially stored in the DRAM 1430. DRAM is a common term for processor memory, and though DRAM is volatile memory, processor memory can be volatile and/or non-volatile. Though not illustrated here, the host system 1400 can include other volatile and non-volatile memories for other purposes. For example, the host system 1400 can include a Read-Only Memory (ROM) that stores boot code for booting the host system 1400 at power on, and/or Basic Input/Output System (BIOS) code.

Though not illustrated here, the DRAM 1430 can store instructions for various programs, which can be loaded into and be executed by the host processor 1472. For example, the DRAM 1430 can be storing instructions for an operating system, one or more data stores, one or more application programs, one or more drivers, and/or services for implementing the features disclosed herein.

The operating system can manage and orchestrate the overall operation of the host system 1400, such as scheduling tasks, executing applications, and/or controller peripheral devices, among other operations. In some examples, a host system 1400 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1400. For example, some drivers can provide communication between the operating system and peripheral devices or I/O devices 1432. Alternatively or additionally, some drivers may provide communication between application programs and the operating system, and/or application programs and peripheral devices accessible to the host system 1400. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1432 can include hardware for connecting to user input and output devices, such as keyboards, mice, pens, tablets, voice input devices, touch input devices, displays or monitors, speakers, and printers, among other devices. The I/O devices 1432 can also include storage drives and/or network interfaces for connecting to a network 1480. For example, the host system 1400 can use a network interface to communicate with storage devices, user terminals, other computing devices or servers, and/or other networks, among various examples.

In various examples, one or more of the I/O devices 1432 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1400 or may be in an external enclosure. A storage device can be fixed (e.g., attached by screws) or removable (e.g., having a physical release mechanism and possibly a hot-plug mechanism).

Storage devices, the DRAM 1430, and any other memory component in the host system 1400 are examples of computer-readable storage media. Computer-readable storage media are physical mediums that are capable of storing data in a format that can be read by a device such as the host processor 1472. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1432 can be PCI-based devices. In these examples, a PCI-based I/O device includes a PCI interface for communicating with the host system 1400. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1474 can include hardware for coordinating the operations of the acceleration engine 1460. For example, the support systems 1474 can include a microprocessor that coordinates the activities of the acceleration engine 1460, including moving data around on the acceleration engine 1460. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1472. In some examples, the program executed by the microprocessor is stored on the hardware of microprocessor, or on a non-volatile memory chip in the host system 1400. In some examples, the microprocessor and the acceleration engine 1460 can be on chip, such as one integrated circuit on the same die and in the same package.

In some examples, the support systems 1474 can be responsible for taking instructions from the host processor 1472 when programs executing on the host processor 1472 request the execution of a neural network. For example, the host processor 1472 can provide the support systems 1474 with a set of input data and a task that is to be performed on the set of input data. In this example, the support systems 1474 can identify a neural network that can perform the task, and can program the acceleration engine 1460 to execute the neural network on the set of input data. In some examples, the support systems 1474 only needs to select an appropriate neural network processing engine of the neural network processor. In some examples, the support systems 1474 may need to load the data for the neural network onto the acceleration engine 1460 before the acceleration engine 1460 can start executing the neural network. In these and other examples, the support systems 1474 can further receive the output of executing the neural network, and provide the output back to the host processor 1472.

In some examples, the operations of the support systems 1474 can be handled by the host processor 1472. In these examples, the support systems 1474 may not be needed and can be omitted from the host system 1400.

In various examples, the host system 1400 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1400 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 15:
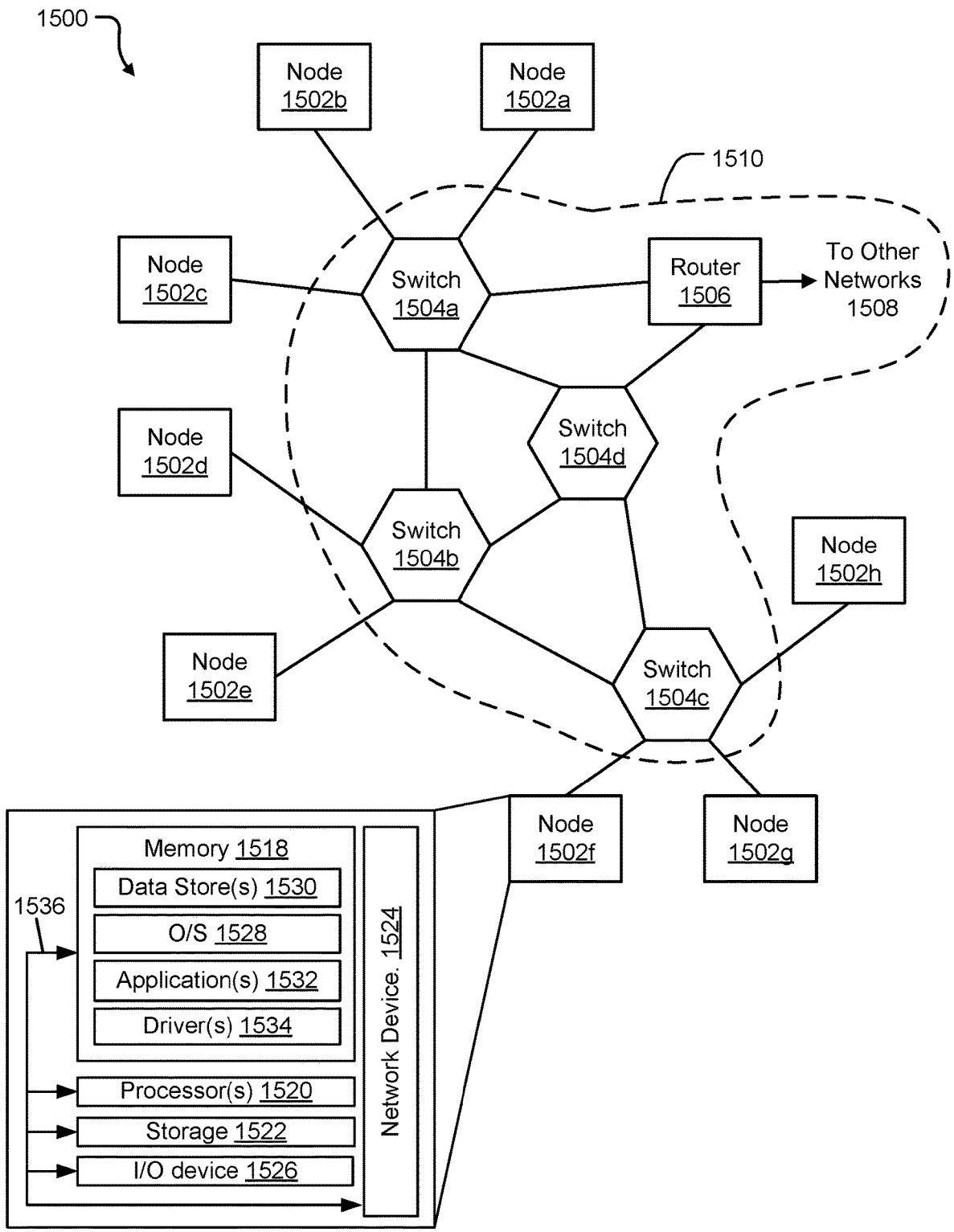
FIG. 15 illustrates an example network.

FIG. 15 illustrates an example network 1500, which can include one or more host systems, such as the host system illustrated in FIG. 14. For example, the example network 1500 of FIG. 15 includes multiple nodes 1502a-1502h, one or more of which can be a host system such as is illustrated in FIG. 14. Others of the nodes 1502a-1502h can be other computing devices, each of which include at least a memory for storing program instructions, a processor for executing the instructions, and a network interface for connecting to the network 1500.

In various examples, the network 1500 can be used to process data. For example, input data can be received at one of the nodes 1502a-1502h or from other networks 1508 with which the network 1500 can communicate. In this example, the input data can be directed to a node in the network 1500 that includes an acceleration engine, for the acceleration engine to operate on and produce a result. The result can then be transferred to the node or other network from which the input data was received. In various examples, input data can be accumulated from various sources, including one or more of the nodes 1502a-1502h and/or computing devices located in the other networks 1508, and the accumulated input data can be directed to one or more host systems in the network 1500. Results from the host systems can then be distributed back to the sources from which the input data was gathered.

In various examples, one or more of the nodes 1502a-1502h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 15, the nodes 1502a-1502h are connected to one another using a switched architecture with point-to point links. The switched architecture includes multiple switches 1504a-1504d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1504a-1504d of FIG. 15 may be connected to the nodes 1502a-1502h and provide multiple paths between any two nodes.

The network 1500 may also include one or more network devices for connection with other networks 1508, such as a router 1506. Routers use headers and forwarding tables to determine the best path for forwarding the packets, and use protocols such as internet control message protocol (ICMP) to communicate with each other and configure the best route between any two devices. The router 1506 of FIG. 15 can be used to connect to other networks 1508 such as subnets, LANs, wide area networks (WANs), and/or the Internet.

In some examples, network 1500 may include any one or a combination of many different types of networks, such as cable networks, the Internet, wireless networks, cellular networks and other private and/or public networks. The interconnected switches 1504a-1504d and the router 1506, if present, may be referred to as a switch fabric 1510, a fabric, a network fabric, or simply a network. In the context of a computer network, terms "fabric" and "network" may be used interchangeably herein.

The nodes 1502a-1502h may be any combination of host systems, processor nodes, storage subsystems, and I/O chassis that represent user devices, service provider computers or third party computers.

User devices may include computing devices to access an application 1532 (e.g., a web browser or mobile device application). In some aspects, the application 1532 may be hosted, managed, and/or provided by a computing resources service or service provider. The application 1532 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1508. Additionally, the user device(s) may be part of the distributed system managed by, controlled by, or otherwise part of the service provider computer(s) (e.g., a console device integrated with the service provider computers).

The node(s) of FIG. 15 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1532 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1502a-1502h may include at least one memory 1518 and one or more processing units (or processor(s) 1520). The processor(s) 1520 may be implemented in hardware, computer-executable instructions, firmware, or combinations thereof. Computer-executable instruction or firmware implementations of the processor(s) 1520 may include computer-executable or machine-executable instructions written in any suitable programming language to perform the various functions described.

In some instances, the hardware processor(s) 1520 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1518 may store program instructions that are loadable and executable on the processor(s) 1520, as well as data generated during the execution of these programs. Depending on the configuration and type of the node(s) 1502a-1502h, the memory 1518 may be volatile (such as RAM) and/or non-volatile (such as ROM, flash memory, etc.). The memory 1518 may include an operating system 1528, one or more data stores 1530, one or more application programs 1532, one or more drivers 1534, and/or services for implementing the features disclosed herein.

The operating system 1528 may support nodes 1502a-1502h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1528 may also be a proprietary operating system.

The data stores 1530 may include permanent or transitory data used and/or operated on by the operating system 1528, application programs 1532, or drivers 1534. Examples of such data include web pages, video data, audio data, images, user data, and so on. The information in the data stores 1530 may, in some implementations, be provided over the network(s) 1508 to user devices. In some cases, the data stores 1530 may additionally or alternatively include stored application programs and/or drivers. Alternatively or additionally, the data stores 1530 may store standard and/or proprietary software libraries, and/or standard and/or proprietary application user interface (API) libraries. Information stored in the data stores 1530 may be machine-readable object code, source code, interpreted code, or intermediate code.

The drivers 1534 include programs that may provide communication between components in a node. For example, some drivers 1534 may provide communication between the operating system 1528 and additional storage 1522, network device 1524, and/or I/O device 1526. Alternatively or additionally, some drivers 1534 may provide communication between application programs 1532 and the operating system 1528, and/or application programs 1532 and peripheral devices accessible to the service provider computer. In many cases, the drivers 1534 may include drivers that provide well-understood functionality (e.g., printer drivers, display drivers, hard disk drivers, Solid State Device drivers). In other cases, the drivers 1534 may provide proprietary or specialized functionality.

The service provider computer(s) or servers may also include additional storage 1522, which may include removable storage and/or non-removable storage. The additional storage 1522 may include magnetic storage, optical disks, solid state disks, flash memory, and/or tape storage. The additional storage 1522 may be housed in the same chassis as the node(s) 1502a-1502h or may be in an external enclosure. The memory 1518 and/or additional storage 1522 and their associated computer-readable media may provide non-volatile storage of computer-readable instructions, data structures, program modules, and other data for the computing devices. In some implementations, the memory 1518 may include multiple different types of memory, such as SRAM, DRAM, or ROM.

The memory 1518 and the additional storage 1522, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1518 and the additional storage 1522 are examples of computer storage media. Additional types of computer storage media that may be present in the node(s) 1502a-1502h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1502a-1502h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1502a-1502h may also include I/O device(s) 1526, such as a keyboard, a mouse, a pen, a voice input device, a touch input device, a display, speakers, a printer, and the like. The node(s) 1502a-1502h may also include one or more communication channels 1536. A communication channel 1536 may provide a medium over which the various components of the node(s) 1502a-1502h can communicate. The communication channel or channels 1536 may take the form of a bus, a ring, a switching fabric, or a network.

The node(s) 1502a-1502h may also contain network device(s) 1524 that allow the node(s) 1502a-1502h to communicate with a stored database, another computing device or server, user terminals and/or other devices on the network(s) 1500.

In some implementations, the network device 1524 is a peripheral device, such as a PCI-based device. In these implementations, the network device 1524 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1524 may be connected to a computing system using a PCIe interface.

A PCI-based device may include one or more functions. A "function" describes operations that may be provided by the network device 1524. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1524 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A distributed system for concurrently training neural network models, the distributed system comprising:
   a first worker node configured to:
      receive a first neural network model, a first set of weights associated with the first neural network model, a second neural network model, and a second set of weights associated with the second neural network model, wherein the second neural network model is different from the first neural network model;
      compute a first set of gradients using the first neural network model and the first set of weights;
      transmit the first set of gradients to the second worker node over a network as each of the first set of gradients is computed and becomes available for transmission;
      thereafter, compute a second set of gradients using the second neural network model and the second set of weights; and transmit the second set of gradients to the second worker node over the network as each of the second set of gradients is computed and becomes available for transmission;

a second worker node configured to:
receive the first set of gradients from the first worker node over the network;
compute a first set of synchronized gradients based on the first set of gradients and a first set of other received gradients as each of the first set of gradients is received, wherein at least a portion of the first set of synchronized gradients and at least a portion of the second set of gradients are computed simultaneously;
transmit the first set of synchronized gradients to the first worker node over the network;
receive the second set of gradients from the first worker node over the network;
compute a second set of synchronized gradients based on the second set of gradients and a second set of other received gradients as each of the second set of gradients is received; and
transmit the second set of synchronized gradients to the first worker node over the network.

2. The distributed system of claim 1, wherein the first worker node is further configured to:
receive training data comprising training input data and reference output data, wherein the first set of gradients are computed based on the training data.

3. The distributed system of claim 2, wherein the second set of gradients are computed based on the training data.

4. The distributed system of claim 1, wherein the first set of gradients includes gradients for a first layer of the first neural network model and gradients for a second layer of the first neural network model, wherein the gradients for the second layer are computed prior to the gradients for the first layer.

5. A method comprising:
computing, at a first worker node of a distributed system, a first set of gradients using a first neural network model and a first set of weights associated with the first neural network model;
transmitting the first set of gradients from the first worker node to a second worker node of the distributed system, the second worker node configured to compute a first set of synchronized gradients based on the first set of gradients;
while the first set of synchronized gradients are being computed, computing, at the first worker node, a second set of gradients using a second neural network model and a second set of weights associated with the second neural network model; and
transmitting the second set of gradients from the first worker node to the second worker node, the second worker node configured to compute a second set of synchronized gradients based on the second set of gradients.

6. The method of claim 5, further comprising:
receiving the first set of synchronized gradients from the second worker node; and
adjusting the first set of weights using the first set of synchronized gradients.

7. The method of claim 6, wherein at least a portion of the first set of weights are adjusted while at least a portion of the second set of synchronized gradients are computed.

8. The method of claim 6, further comprising:
receiving the second set of synchronized gradients from the second worker node; and
adjusting the second set of weights using the second set of synchronized gradients.

9. The method of claim 5, wherein at least a portion of the first set of gradients and at least a portion of the first set of synchronized gradients are computed simultaneously.

10. The method of claim 5, wherein at least a portion of the second set of gradients and at least a portion of the second set of synchronized gradients are computed simultaneously.

11. The method of claim 5, further comprising:
receiving, at the first worker node, the first neural network model, the first set of weights, the second neural network model, and the second set of weights.

12. The method of claim 5, wherein the second neural network model is different than the first neural network model.

13. A non-transitory computer-readable medium having stored therein instructions that, when executed by one or more processors, cause the one or more processors to perform operations including:
computing, at a first worker node of a distributed system, a first set of gradients using a first neural network model and a first set of weights associated with the first neural network model;
transmitting the first set of gradients from the first worker node to a second worker node of the distributed system, the second worker node configured to compute a first set of synchronized gradients based on the first set of gradients;
while the first set of synchronized gradients are being computed, computing, at the first worker node, a second set of gradients using a second neural network model and a second set of weights associated with the second neural network model; and
transmitting the second set of gradients from the first worker node to the second worker node, the second worker node configured to compute a second set of synchronized gradients based on the second set of gradients.

14. The non-transitory computer-readable medium of claim 13, wherein the operations further comprise:
receiving the first set of synchronized gradients from the second worker node; and
adjusting the first set of weights using the first set of synchronized gradients.

15. The non-transitory computer-readable medium of claim 14, wherein at least a portion of the first set of weights are adjusted while at least a portion of the second set of synchronized gradients are computed.

16. The non-transitory computer-readable medium of claim 14, wherein the operations further comprise:
receiving the second set of synchronized gradients from the second worker node; and
adjusting the second set of weights using the second set of synchronized gradients.

17. The non-transitory computer-readable medium of claim 13, wherein at least a portion of the first set of gradients and at least a portion of the first set of synchronized gradients are computed simultaneously.

18. The non-transitory computer-readable medium of claim 13, wherein at least a portion of the second set of gradients and at least a portion of the second set of synchronized gradients are computed simultaneously.

19. The non-transitory computer-readable medium of claim 13, wherein the operations further comprise:
receiving, at the first worker node, the first neural network model, the first set of weights, the second neural network model, and the second set of weights.

20. The non-transitory computer-readable medium of claim 13, wherein the second neural network model is different than the first neural network model.

* * * * *